US010572957B2

(12) United States Patent
Harada et al.

(10) Patent No.: US 10,572,957 B2
(45) Date of Patent: Feb. 25, 2020

(54) COMBINATION DESIRABILITY DETERMINATION APPARATUS, METHOD FOR DETERMINING DESIRABILITY OF COMBINATION, AND RECORDING MEDIUM STORING PROGRAM

(71) Applicant: Panasonic Intellectual Property Corporation of America, Torrance, CA (US)

(72) Inventors: Kumi Harada, Osaka (JP); Tomoaki Ohira, Tokyo (JP); Hideyuki Yoshida, Osaka (JP); Hayashi Ito, Chiba (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 638 days.

(21) Appl. No.: 14/790,046

(22) Filed: Jul. 2, 2015

(65) Prior Publication Data
US 2016/0012555 A1 Jan. 14, 2016

(30) Foreign Application Priority Data

Jul. 9, 2014 (JP) .................................. 2014-141543

(51) Int. Cl.
*G06Q 30/00* (2012.01)
*G06Q 50/16* (2012.01)
*G06Q 30/06* (2012.01)

(52) U.S. Cl.
CPC ......... *G06Q 50/16* (2013.01); *G06Q 30/0623* (2013.01)

(58) Field of Classification Search
None
See application file for complete search history.

(56) References Cited

U.S. PATENT DOCUMENTS 8,024,349 B1 * 9/2011 Shao ................. G06F 17/30864
707/756
2007/0043770 A1 * 2/2007 Goodrich ............... G06Q 30/00
(Continued)

FOREIGN PATENT DOCUMENTS

JP 2003-085402 3/2003
JP 2013-099004 5/2013
(Continued)

OTHER PUBLICATIONS

John McGuinness, "Dealing with the 'is this area safe?' question. Tips and Techniques", Aug. 11, 2010, zillow.com (https://www.zillow.com/advice-thread/Dealing-with-the-is-this-area-safe-question-Tips-and-techniques/361699/).*

(Continued)

*Primary Examiner* — Naeem U Haq
*Assistant Examiner* — Norman Donald Sutch, Jr.
(74) *Attorney, Agent, or Firm* — McDermott Will & Emery LLP

(57) ABSTRACT

A server apparatus includes a storage unit that stores information indicating activity patterns of an applicant and information indicating activity patterns of residents of properties neighboring a candidate property, which is a candidate for a property to which the applicant moves, and a determination unit that determines the desirability of a combination of the applicant and the candidate property on the basis of the information indicating the activity patterns of the applicant and the information indicating the activity patterns of the residents of the neighboring properties.

17 Claims, 31 Drawing Sheets

(56) References Cited

U.S. PATENT DOCUMENTS

| | | | | |
|---|---|---|---|---|
| 2014/0058572 A1* | 2/2014 | Stein | ...................... | G06O 50/06 |
| | | | | 700/291 |
| 2014/0358943 A1* | 12/2014 | Raymond | .............. | G06Q 10/10 |
| | | | | 707/748 |

FOREIGN PATENT DOCUMENTS

| | | | | | |
|---|---|---|---|---|---|
| JP | 2015176477 | * | 3/2014 | ............. | G06Q 50/16 |
| JP | 2015185040 | * | 3/2014 | ............. | G06Q 50/06 |
| WO | WO 2013066868 A1 | * | 10/2011 | ............. | G06Q 10/06 |

OTHER PUBLICATIONS

Jack I. Lerner, "Taking the Long View on the Fourth Amendment: Stored Records and the Sanctity of the Home", 2008, Berkely Law Scholarship Repository (https://scholarship.law.berkeley.edu/facpubs/2501/).*

Zheng Qin, "Introduction to E-commerce", 2009, Springer, springer.com (Year: 2009).*

Biying Yu, et al; "Analysis of the residential location choice and household energy consumption behavior by incorporating multiple self-selection effects"; Apr. 13, 2012; Elsevier Energy Policy 46 (2012); 319-334 (Year: 2012).*

* cited by examiner

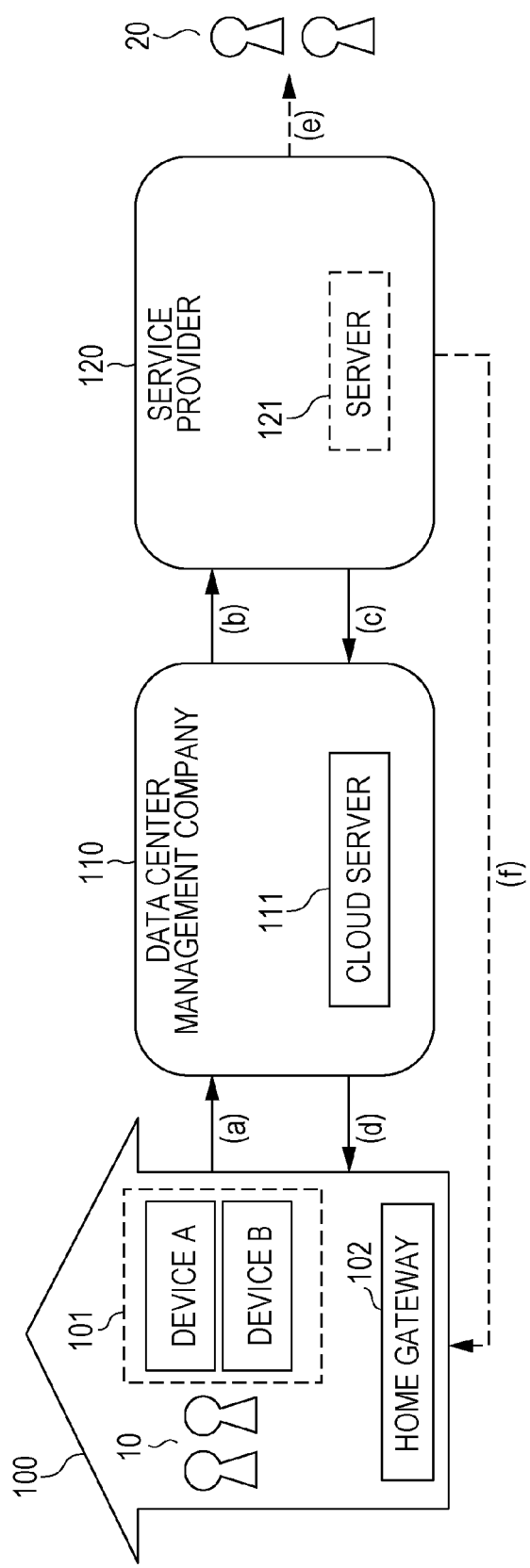
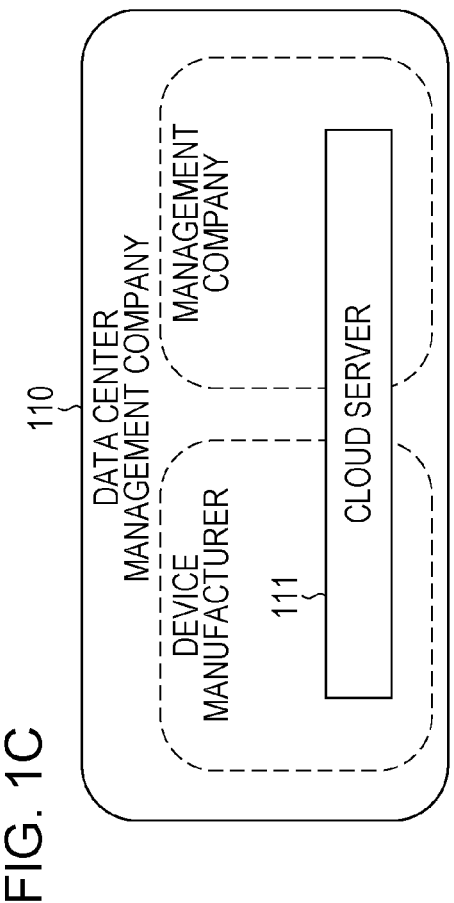
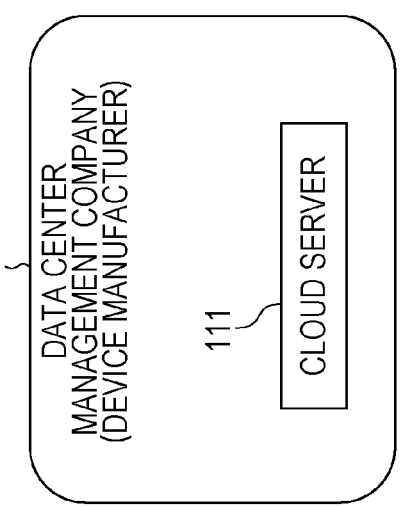

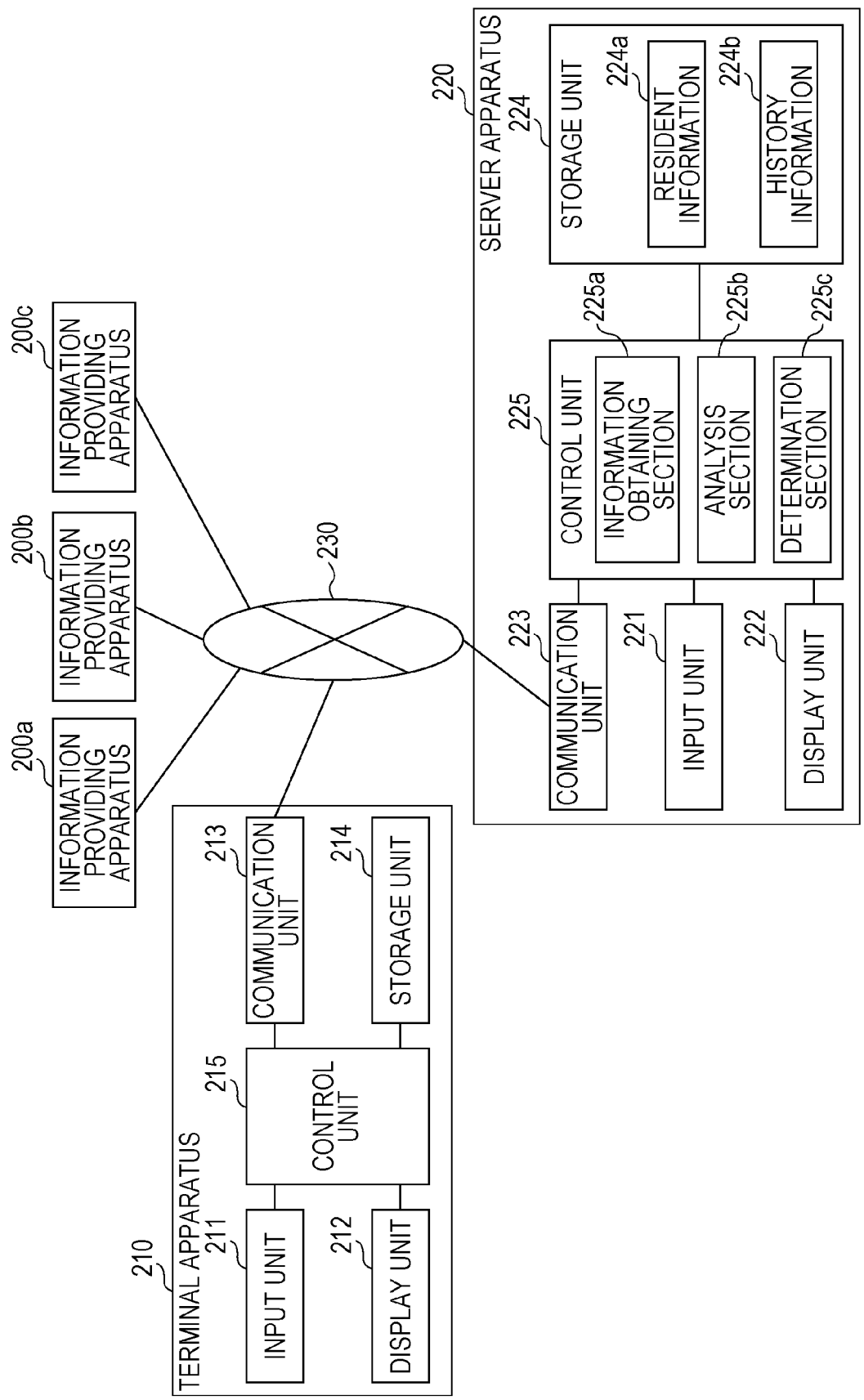

FIG. 3

| PERSON ID | PROPERTY ID | PROPERTY INFORMATION | | TIME PERIOD | POWER USE DATA | DEVICE DATA | | | | LIFESTYLE PATTERN | | | |
|---|---|---|---|---|---|---|---|---|---|---|---|---|---|
| | | COMMUTING TIME | ... | | AMOUNT OF POWER USED | MICROWAVE | LIGHTS | LIVING ROOM AIR CONDITIONER | ... | RISING | ... | GOING OUT | ... | SLEEP |
| M_001 | A_101 | 1 HOUR | ... | 0:00 TO 0:05 | $W\_0$ | $Xa\_0$ | $Xb\_0$ | $Xc\_0$ | ... | — | ... | — | ... | — |
| | | | | ... | ... | ... | ... | ... | ... | ... | ... | ... | ... | ... |
| | | | | 1:00 TO 1:05 | $W\_1$ | $Xa\_1$ | $Xb\_1$ | $Xc\_1$ | ... | — | ... | — | ... | ○ |
| | | | | 1:05 TO 1:10 | $W\_2$ | $Xa\_2$ | $Xb\_2$ | $Xc\_2$ | ... | — | ... | — | ... | — |
| | | | | ... | ... | ... | ... | ... | ... | ... | ... | ... | ... | ... |
| | | | | 5:55 TO 6:00 | $W\_i$ | $Xa\_i$ | $Xb\_i$ | $Xc\_i$ | ... | ○ | ... | — | ... | — |
| | | | | 6:00 TO 6:05 | $W\_{i+1}$ | $Xa\_{i+1}$ | $Xb\_{i+1}$ | $Xc\_{i+1}$ | ... | — | ... | — | ... | — |
| | | | | ... | ... | ... | ... | ... | ... | ... | ... | ... | ... | ... |
| M_002 | A_102 | 0.5 HOUR | ... | ... | ... | ... | ... | ... | ... | ... | ... | ... | ... | ... |
| ... | ... | ... | ... | ... | ... | ... | ... | ... | ... | ... | ... | ... | ... | ... |
| M_009 | B_101 | ... | ... | ... | ... | ... | ... | ... | ... | ... | ... | ... | ... | ... |
| ... | ... | ... | ... | ... | ... | ... | ... | ... | ... | ... | ... | ... | ... | ... |

FIG. 7

| PERSON ID | PROPERTY ID | PROPERTY INFORMATION | | ... | TIME PERIOD | POWER USE DATA | DEVICE DATA | | | ... | LIFESTYLE PATTERN | | | ... |
| | | PERIOD OF RESIDENCE | COMMUTING TIME | | | AMOUNT OF POWER USED | MICROWAVE | LIGHTS | LIVING ROOM AIR CONDITIONER | | RISING | GOING OUT | SLEEP | |
| M_100 | X_201 | 2007 TO 2010 | 1 HOUR | ... | 0:00 TO 0:05 | V_1 | Ya_1 | Yb_1 | Yc_1 | ... | – | – | ○ | ... |
| | | | | | 0:05 TO 0:10 | V_2 | Ya_2 | Yb_2 | Yc_2 | ... | – | – | – | ... |
| | | | | | ⋮ | ⋮ | ⋮ | ⋮ | ⋮ | ... | ⋮ | ⋮ | ⋮ | ... |
| | | | | | 5:55 TO 6:00 | V_i | Ya_i | Yb_i | Yc_i | ... | – | – | – | ... |
| | | | | | 6:00 TO 6:05 | V_i+1 | Ya_i+1 | Yb_i+1 | Yc_i+1 | ... | ○ | – | – | ... |
| | | | | | ⋮ | ⋮ | ⋮ | ⋮ | ⋮ | ... | ⋮ | ⋮ | ⋮ | ... |
| | Y_302 | 2011 TO 2014 | 1.5 HOURS | ... | ⋮ | ⋮ | ⋮ | ⋮ | ⋮ | ... | ⋮ | ⋮ | ⋮ | ... |
| ⋮ | ⋮ | ⋮ | ⋮ | | | | | | | | | | | |

FIG. 8A

BUILDING A

| PROPERTY NO. | 01 | 02 | 03 |
|---|---|---|---|
| 3RD FLOOR | 22:00-4:00 | 0:00-7:00 | 20:00-5:00 |
| 2ND FLOOR | 23:00-5:00 | CANDIDATE PROPERTY | 20:00-7:00 |
| 1ST FLOOR | 1:00-6:00 | 2:00-8:00 | 23:00-6:00 |

FIG. 8B

BUILDING B

| PROPERTY NO. | 01 | 02 |
|---|---|---|
| 4TH FLOOR | 21:00-5:00 | 1:00-9:00 |
| 3RD FLOOR | 1:00-7:00 | 0:00-6:00 |
| 2ND FLOOR | CANDIDATE PROPERTY | 23:00-7:00 |
| 1ST FLOOR | 22:00-6:00 | 20:00-5:00 |

FIG. 8C

| LIFESTYLE PATTERN | APPLICANT TIME PERIOD |
|---|---|
| SLEEPING HOURS | 0:00-6:00 |
| TV WATCHING PERIOD | 21:00-22:30 |
| BATHING PERIOD | 22:30-23:00 |
| ... | ... |

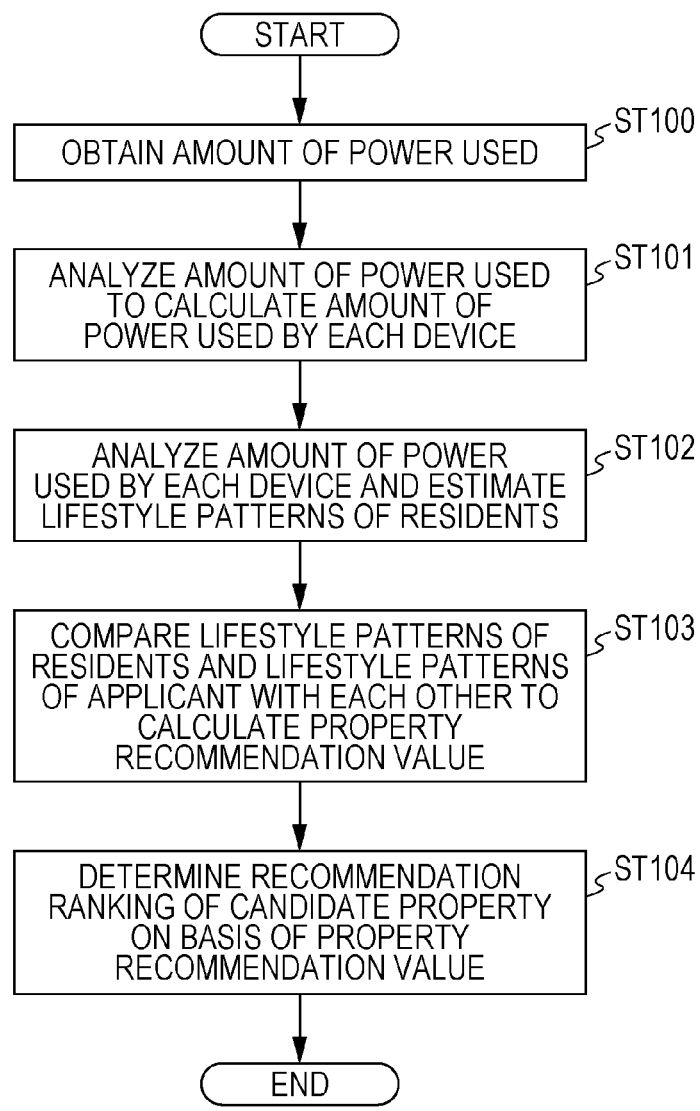

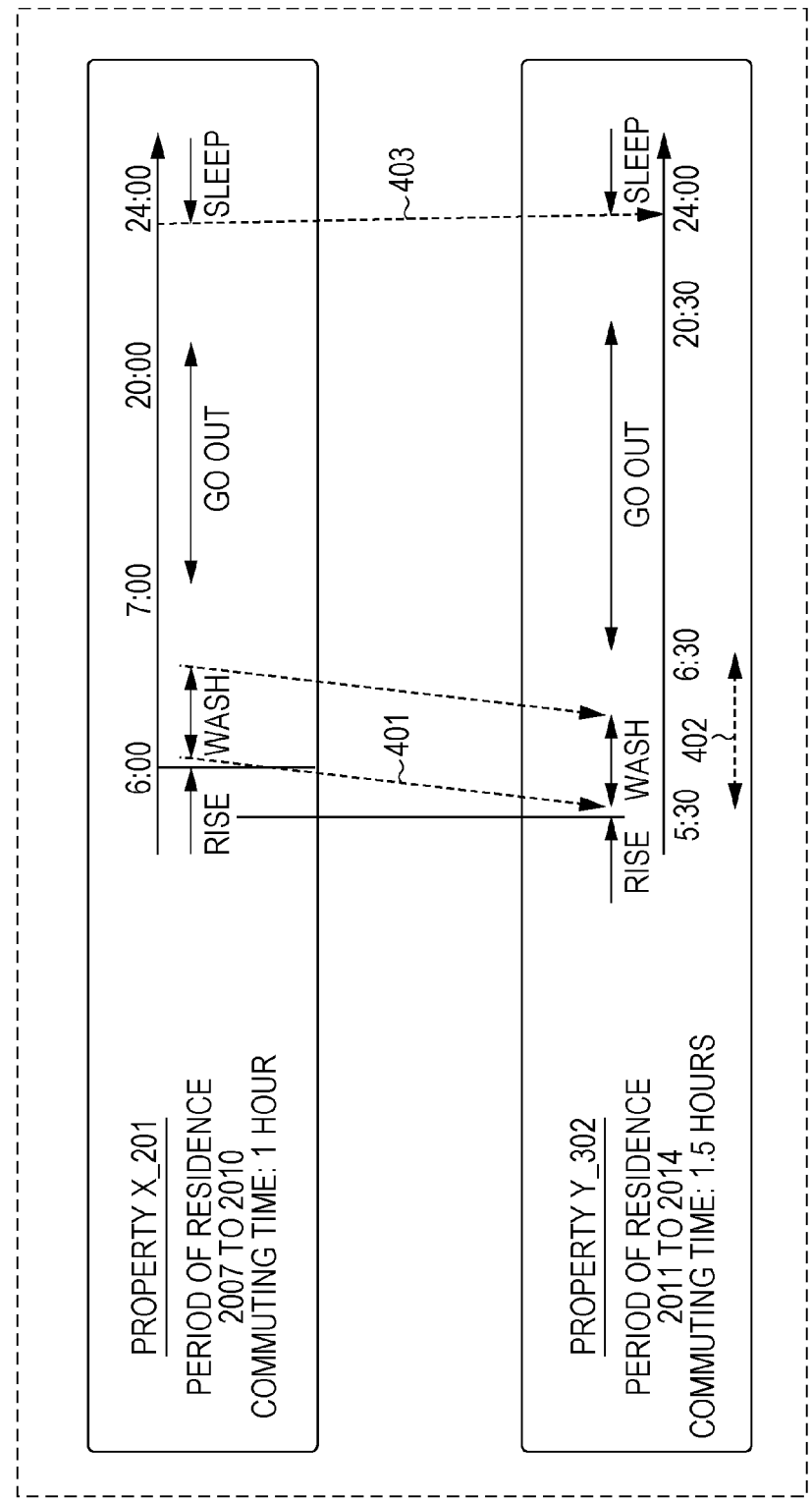

FIG. 13A

ESTIMATED SLEEPING HOURS 0:00–6:45

BUILDING A

| PROPERTY NO. | 01 | 02 | 03 |
|---|---|---|---|
| 3RD FLOOR | 22:00–4:00 | 0:00–7:00 | 20:00–5:00 |
| 2ND FLOOR | 23:00–5:00 | CANDIDATE PROPERTY | 20:00–7:00 |
| 1ST FLOOR | 1:00–6:00 | 2:00–8:00 | 23:00–6:00 |

| IMPORTANCE | ROOM | SLEEPING HOURS DIFFERENCE |
|---|---|---|
| 1 | 201 | 1.75 |
| 1 | 203 | 0 |
| 1 | 102 | 2 |
| 1 | 302 | 0 |
| 0.5 | 301 | 1.375 |
| 0.5 | 303 | 0.875 |
| PROPERTY RECOMMENDATION VALUE | | 6 |

FIG. 13B

ESTIMATED SLEEPING HOURS 0:00–6:30

BUILDING B

| PROPERTY NO. | 01 | 02 |
|---|---|---|
| 4TH FLOOR | 21:00–5:00 | 1:00–9:00 |
| 3RD FLOOR | 1:00–7:00 | 0:00–6:00 |
| 2ND FLOOR | CANDIDATE PROPERTY | 23:00–7:00 |
| 1ST FLOOR | 22:00–6:00 | 20:00–5:00 |

| IMPORTANCE | ROOM | SLEEPING HOURS DIFFERENCE |
|---|---|---|
| 1 | 202 | 1.5 |
| 1 | 101 | 0.5 |
| 1 | 301 | 1 |
| 0.5 | 102 | 1.5 |
| 0.5 | 302 | 0 |
| PROPERTY RECOMMENDATION VALUE | | 4.5 |

FIG. 15C

| | PROPERTY SEARCH RESULTS | |
|---|---|---|
| 506 | PROPERTIES WITH HIGHEST DEGREES OF LIFESTYLE PATTERN MATCHING DISPLAYED FIRST | |
| 1 | LIFESTYLE PATTERN MATCHING<br>·SLEEP 89%<br>·WASHING 28% [DETAILS] | PROPERTY OUTLINE<br>·RENT ·AGE<br>·FLOOR PLAN ·ASPECT<br>·AREA ·MISCELLANEOUS |
| 2 | LIFESTYLE PATTERN MATCHING<br>·SLEEP 85%<br>·WASHING 37% [DETAILS] | PROPERTY OUTLINE<br>·RENT ·AGE<br>·FLOOR PLAN ·ASPECT<br>·AREA ·MISCELLANEOUS |
| 3 | LIFESTYLE PATTERN MATCHING<br>·SLEEP 70%<br>·WASHING 23% [DETAILS] | PROPERTY OUTLINE<br>·RENT ·AGE<br>·FLOOR PLAN ·ASPECT<br>·AREA ·MISCELLANEOUS |
| 4 | LIFESTYLE PATTERN MATCHING<br>·SLEEP 72%<br>·WASHING 50% [DETAILS] | PROPERTY OUTLINE<br>·RENT ·AGE<br>·FLOOR PLAN ·ASPECT<br>·AREA ·MISCELLANEOUS |

[ DISPLAY NEXT RESULTS ]

FIG. 20D

707 — APPLICANT EVALUATION RESULTS

APPLICANTS WITH HIGHEST DEGREES OF
LIFESTYLE PATTERN MATCHING DISPLAYED FIRST

| | | LIFESTYLE PATTERN MATCHING | | APPLICANT C |
|---|---|---|---|---|
| 1 | | · SLEEP 89%<br>· TV 28% | DETAILS | · GENDER<br>· AGE<br>· DEMAND |
| 2 | | LIFESTYLE PATTERN MATCHING<br>· SLEEP 85%<br>· WASHING 37% | DETAILS | APPLICANT A<br>· GENDER<br>· AGE<br>· DEMAND |
| 3 | | LIFESTYLE PATTERN MATCHING<br>· SLEEP 70%<br>· WASHING 23% | DETAILS | APPLICANT K<br>· GENDER<br>· AGE<br>· DEMAND |
| 4 | | LIFESTYLE PATTERN MATCHING<br>· SLEEP 72%<br>· WASHING 50% | DETAILS | APPLICANT B<br>· GENDER<br>· AGE<br>· DEMAND |

DISPLAY NEXT RESULTS

COMBINATION DESIRABILITY DETERMINATION APPARATUS, METHOD FOR DETERMINING DESIRABILITY OF COMBINATION, AND RECORDING MEDIUM STORING PROGRAM

BACKGROUND

1. Technical Field

The present disclosure relates to a combination desirability determination apparatus, a method for determining the desirability of a combination, and a recording medium storing a program that determine the desirability of a combination of an applicant and a property.

2. Description of the Related Art

As a result of various changes in housing environments and demand for living space these years, there are more and more apartment houses and shared houses, in which a plurality of persons live in a single building. In general, when an applicant searches for a desired property, the applicant takes into consideration conditions such as a location, a price, room arrangement, and equipment of each property.

A system that matches an applicant and a property has been proposed. In Japanese Patent No. 4698093, for example, a real estate transaction support system is disclosed that receives, from property providers, texts explaining advantages of properties to be provided while receiving, from an applicant, a text explaining advantages of a desired property and finding a property having the advantages input by the applicant.

In addition, energy conservation has been recently gaining in importance, and systems that realize energy conservation have been being developed. In Japanese Unexamined Patent Application Publication No. 2013-099004, for example, a technique for supporting energy conservation activities of a plurality of users by separately measuring the power consumption of the plurality of users and providing rankings of peak values of the power consumption is disclosed.

SUMMARY

In one general aspect, the techniques disclosed here feature a combination desirability determination apparatus including a storage that stores information indicating activity patterns of an applicant and information indicating activity patterns of residents of properties neighboring a candidate property, which is a candidate for a property to which the applicant moves, and a determiner that determines desirability of a combination of the applicant and the candidate property on the basis of the information indicating the activity patterns of the applicant and the information indicating the activity patterns of the residents of the neighboring properties.

According to the present disclosure, it is possible to determine the desirability of a combination of an applicant and a property appropriately and effectively.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1A is a diagram illustrating an outline of a combination desirability determination service according to a first embodiment;

FIG. 1B is a diagram illustrating the outline of the combination desirability determination service according to the first embodiment;

FIG. 1C is a diagram illustrating the outline of the combination desirability determination service according to the first embodiment;

FIG. 2 is a diagram illustrating an example of the configuration of the combination desirability determination system;

FIG. 3 is a diagram illustrating an example of resident information;

FIG. 7 is a diagram illustrating an example of history information;

FIG. 8A is a diagram illustrating an example of a method for determining the desirability of a combination of an applicant and a candidate property;

FIG. 8B is a diagram illustrating an example of the method for determining the desirability of a combination of an applicant and a candidate property;

FIG. 8C is a diagram illustrating an example of lifestyle patterns of an applicant;

FIG. 10 is a flowchart illustrating an example of a procedure of a process for determining the desirability of a combination performed by a server apparatus;

FIG. 11 is a diagram illustrating an example of past changes in lifestyle patterns of an applicant after the applicant moved to a new property;

FIG. 13A is a diagram illustrating an example of a method for calculating a property recommendation value;

FIG. 13B is a diagram illustrating an example of the method for calculating a property recommendation value;

FIG. 15C is a diagram illustrating an example of a user interface displayed on the terminal apparatus;

FIG. 20D is a diagram illustrating an example of a user interface displayed on the terminal apparatus;

DETAILED DESCRIPTION

Figure 4:
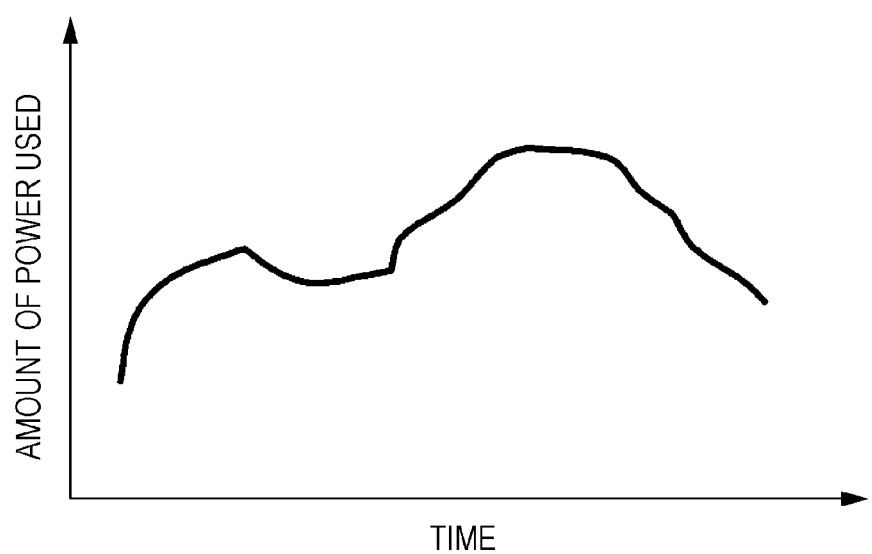
FIG. 4 is a diagram illustrating an example a power use pattern.

First, problems of the examples of the related art found by the present inventors before the present inventors have established the present disclosure will be described.

Underlying Knowledge Forming Basis of the Present Disclosure

With the technique disclosed in Japanese Patent No. 4698093, however, it is difficult to eliminate a possibility that problems or trouble occur between an applicant and neighbors in an apartment house or roommates of a shared house after the applicant moves to the apartment house or the shared house. This is because, with the technique disclosed in Japanese Patent No. 4698093, it is difficult to understand activities of the neighbors or the roommates accurately.

For example, if sleeping hours of an applicant overlap active hours of a neighbor in an apartment house, the neighbor might cause household noises while the applicant is asleep, which might undesirably disturb the applicant's sleep.

A shared house generally includes many facilities used by roommates in common. If two roommates desire to use the same facility (a toilet, a bathroom, a washing machine, or the like) that they desire to use alone, one of the roommates undesirably needs to wait until the other finishes using the facility.

On the other hand, if roommates do not use at the same time the same facility (a television set, a living room, or the like) that they desire to use together, they undesirably cannot have a good time together.

In the case of an apartment house adopting a power rate plan for apartment houses, an applicant who uses power in a manner unsuitable for the power rate plan might move to the apartment house. For example, an applicant who uses an extremely large amount of power compared to the power rate plan or an applicant whose peak of power use is different from those of other residents might move to the apartment house. In addition, with respect to power conservation, if roommates do not use at the same time a facility that can be used by a plurality of persons, the amount of power, water, or gas used for the facility and a rate might undesirably increase.

Furthermore, in the technique disclosed in Japanese Patent No. 4698093, texts input by property providers and an applicant include subjective information. Readers therefore might interpret the texts in different ways. In addition, malicious information such as information different from actual facts, information that exaggerates facts, or information that conceals facts might be input as a text. In these cases, an applicant might undesirably be unable to find a desired property.

On the other hand, the technique disclosed in Japanese Unexamined Patent Application Publication No. 2013-099004 simply provides rakings of peak values of the power consumption of users and is not intended to appropriately determine the desirability of a combination of an applicant and a property.

The present disclosure has been established in order to solve the above-described problems. The present disclosure provides a combination desirability determination apparatus, a method for determining the desirability of a combination, and a recording medium storing a program that are capable of appropriately and effectively determining the desirability of a combination of an applicant and a property.

Embodiments of the present disclosure will be described in detail hereinafter with reference to the drawings. The embodiments that will be described hereinafter are examples and do not limit the present disclosure.

First Embodiment

First, an outline of a combination desirability determination service according to a first embodiment will be described. FIGS. 1A to 1C are diagrams illustrating the outline of the combination desirability determination service according to the present embodiment. FIG. 1A illustrates an example of the entirety of a combination desirability determination system according to the present embodiment. A group 100 is, for example, a company, an organization, a household, or the like of any magnitude.

The group 100 includes a plurality of devices 101, namely Device A and Device B, and a home gateway 102. The plurality of devices 101 might include devices connectable to the Internet (for example, a smartphone, a personal computer (PC), a television set, and the like) and devices that cannot be connected to the Internet by themselves (for example, a microwave, lights, a washing machine, a refrigerator, and the like).

The plurality of devices 101 may include devices that cannot be connected to the Internet by themselves but can be connected to the Internet through the home gateway 102. The group 100 also includes users 10 who use the plurality of devices 101.

A data center management company 110 includes a cloud server 111. The cloud server 111 is a virtual server that cooperates with various devices through the Internet. The cloud server 111 mainly manages big data that is difficult to handle with a common database management tool or the like.

The data center management company 110 operates a data center that manages data and the cloud server 111. Details of operations performed by the data center management company 110 will be described later.

The data center management company 110 is not limited to a company that manages data and the cloud server 111. FIG. 1B illustrates an example in which the data center management company 110 is a device manufacturer.

For example, if a device manufacturer that develops and manufactures one of the plurality of devices 101 manages data and the cloud server 111, the device manufacturer corresponds to the data center management company 110 as illustrated in FIG. 1B.

In addition, the data center management company 110 need not be a single company. FIG. 1C illustrates an example in which the data center management company 110 includes a device manufacturer and a management company. For example, if the device manufacturer and the management company jointly or cooperatively manage data and the cloud server 111, the device manufacture or the management company, or both, corresponds to the data center management company 110 as illustrated in FIG. 1C.

In FIG. 1A, a service provider 120 owns a server 121. The server 121 may be, for example, one configured by a memory of a private PC of any magnitude. The service provider 120 might not own the server 121.

In the above-described service, the home gateway 102 is not mandatory. For example, if the cloud server 111 manages all data, the home gateway 102 need not be used. There might be no device that cannot be connected to the Internet by itself, like when all devices in a household are connected to the Internet.

Next, transmission of information in the above-described service will be described. First, Device A or Device B included in the group 100 transmits log information to the cloud server 111 of the data center management company 110. The cloud server 111 accumulates the log information transmitted from Device A or Device B ((a) in FIG. 1A).

The log information refers to information indicating, for example, operation states and operation times of the plurality of devices 101, consumption of power, gas, and water in each property of an apartment house, or the like. The log information, however, is not limited to this, and may be any information that can be obtained from any device.

The plurality of devices 101 might directly provide the log information for the cloud server 111 through the Internet. The plurality of devices 101 may temporarily store the log information in the home gateway 102, and the home gateway 102 may then provide the log information for the cloud server 111.

Next, the cloud server 111 of the data center management company 110 provides the accumulated log information for the service provider 120 in certain units. The certain units may be units in which the data center management company 110 can sort out the accumulated information and provide the information for the service provider 120, or may be units requested by the service provider 120. Although the term "certain units" has been used, the units need not be constant. The amount of information provided might change in accordance with a situation.

The server 121 owned by the service provider 120 saves the log information as necessary ((b) in FIG. 1A). The service provider 120 then rearranges the log information so that the log information suits a service provided for a user. The service provider 120 provides the rearranged information for the user.

The user for which the information is provided may be one of the users 10 who use the plurality of devices 101, or may be one of external users 20. The service provider 120 may directly provide the information for the user ((e) or (f) in FIG. 1A). Alternatively, the information may be provided for the user through, for example, the cloud server 111 of the data center management company 110 ((c) and (d) in FIG. 1A).

Alternatively, the cloud server 111 of the data center management company 110 may rearrange the log information so that the log information suits the service provided for the user. The cloud server 111 may then provide the rearranged information for the service provider 120.

The users 10 and the users 20 may be different from each other or may be the same.

Next, an example of the combination desirability determination system according to the first embodiment will be described. FIG. 2 is a diagram illustrating an example of the configuration of the combination desirability determination system.

The combination desirability determination system determines the desirability of a combination of an applicant and a property to which the applicant might move (hereinafter referred to as a "candidate property"). More specifically, the combination desirability determination system determines the desirability of a combination of an applicant and a candidate property on the basis of information indicating activity patterns of the applicant and information indicating activity patterns of residents of properties (hereinafter referred to as "neighboring properties") neighboring the candidate property.

The information indicating the activity patterns of the applicant and the information indicating the activity patterns of the residents of the neighboring properties may be information indicating use patterns of power, gas, water, or the like or may be information indicating lifestyle patterns of the applicant and the residents of the neighboring properties, such as sleep and washing.

A case will be described hereinafter in which the information indicating the activity patterns of the applicant is information indicating the lifestyle patterns of the applicant and the information indicating the activity patterns of the residents of the neighboring properties is information indicating the lifestyle patterns of the residents of the neighboring properties.

In the combination desirability determination system, information providing apparatuses 200a to 200c, a terminal apparatus 210, and a server apparatus 220 are connected to one another through a network 230. The network 230 may be a wired network or a wireless network. The network 230 may include both a wired network and a wireless network.

Although FIG. 2 illustrates the three information providing apparatuses 200a to 200c, it is sufficient that there is an information providing apparatus. Although FIG. 2 illustrates the terminal apparatus 210 and the server apparatus 220, there may be a plurality of terminal apparatuses 210 and a plurality of server apparatuses 220, instead.

Each of the information providing apparatuses 200a to 200c is provided for a property and transmits information indicating the amount of power used in the property to the server apparatus 220, which will be described later. For example, each of the information providing apparatuses 200a to 200c may be a distribution switchboard having a function of transmitting the information, or may be a communication apparatus that obtains the information from a distribution switchboard and that transmits the information to the server apparatus 220.

The terminal apparatus 210 receives various pieces of data from the applicant and displays a result of a determination of the desirability of a combination of the applicant and a candidate property. For example, the terminal apparatus 210 may be a mobile terminal such as a smartphone, or may be a desktop terminal such as a PC. Alternatively, the server apparatus 220 may have the function of the terminal apparatus 210.

The terminal apparatus 210 includes an input unit 211, a display unit 212, a communication unit 213, a storage unit 214, and a control unit 215.

The input unit 211 is an input device such as a button, a touch panel, or a keyboard. The input unit 211 receives, from the applicant, the information indicating the lifestyle patterns of the applicant. The input unit 211 also receives, from the applicant, various instructions necessary to find a property suitable for the applicant.

The display unit 212 is a display device such as a display. The communication unit 213 communicates with other apparatuses connected to the network 230. For example, the communication unit 213 transmits information received by the input unit 211 to the server apparatus 220 and receives information transmitted from the server apparatus 220.

The storage unit 214 is a storage device that stores various pieces of information, such as a memory or a hard disk device. The storage unit 214 stores information received by the input unit 211, information generated by the control unit 215, information received by the communication unit 213 from the server apparatus 220, and the like.

The control unit 215 is a control device, such as a processor, that controls processes performed by the terminal apparatus 210. For example, the control unit 215 controls the communication unit 213 to cause the communication unit 213 to transmit information received by the input unit 211 to the server apparatus 220.

The control unit 215 also controls the communication unit 213 to cause the communication unit 213 to receive information transmitted from the server apparatus 220. The control unit 215 reads information stored in the storage unit 214 and displays the information on the display unit 212.

The server apparatus 220 determines the desirability of a combination of an applicant and a candidate property on the basis of information indicating activity patterns of the applicant and information indicating activity patterns of residents of properties neighboring the candidate property. The server apparatus 220 includes an input unit 221, a display unit 222, a communication unit 223, a storage unit 224, and a control unit 225.

The input unit 221 is an input device, such as a keyboard, that receives various pieces of information from a manager of the server apparatus 220 or the like. The display unit 222 is a display device such as a display.

The communication unit 223 communicates with other apparatuses connected to the network 230. For example, the communication unit 223 receives information transmitted from the information providing apparatuses 200a to 200c or the terminal apparatus 210. The communication unit 223 transmits information regarding a result of a determination of the desirability of a combination of an applicant and a candidate property to the terminal apparatus 210.

The storage unit 224 is a storage device, such as a memory or a hard disk device, that stores various pieces of information. The storage unit 224 stores resident information 224a, history information 224b, and the like.

Figure 5:
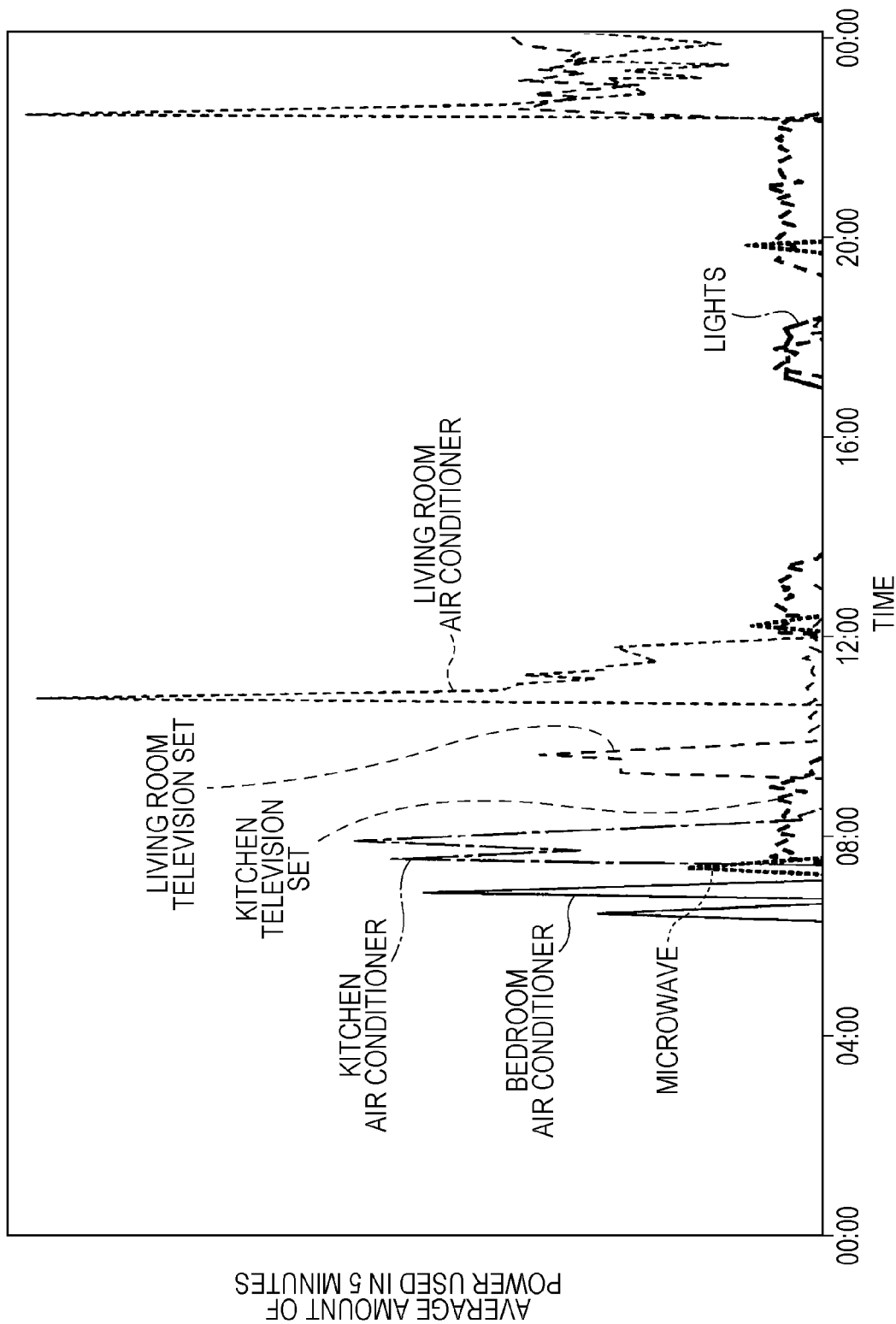
FIG. 5 is a diagram illustrating an example of power use patterns of electrical devices.
Figure 6:
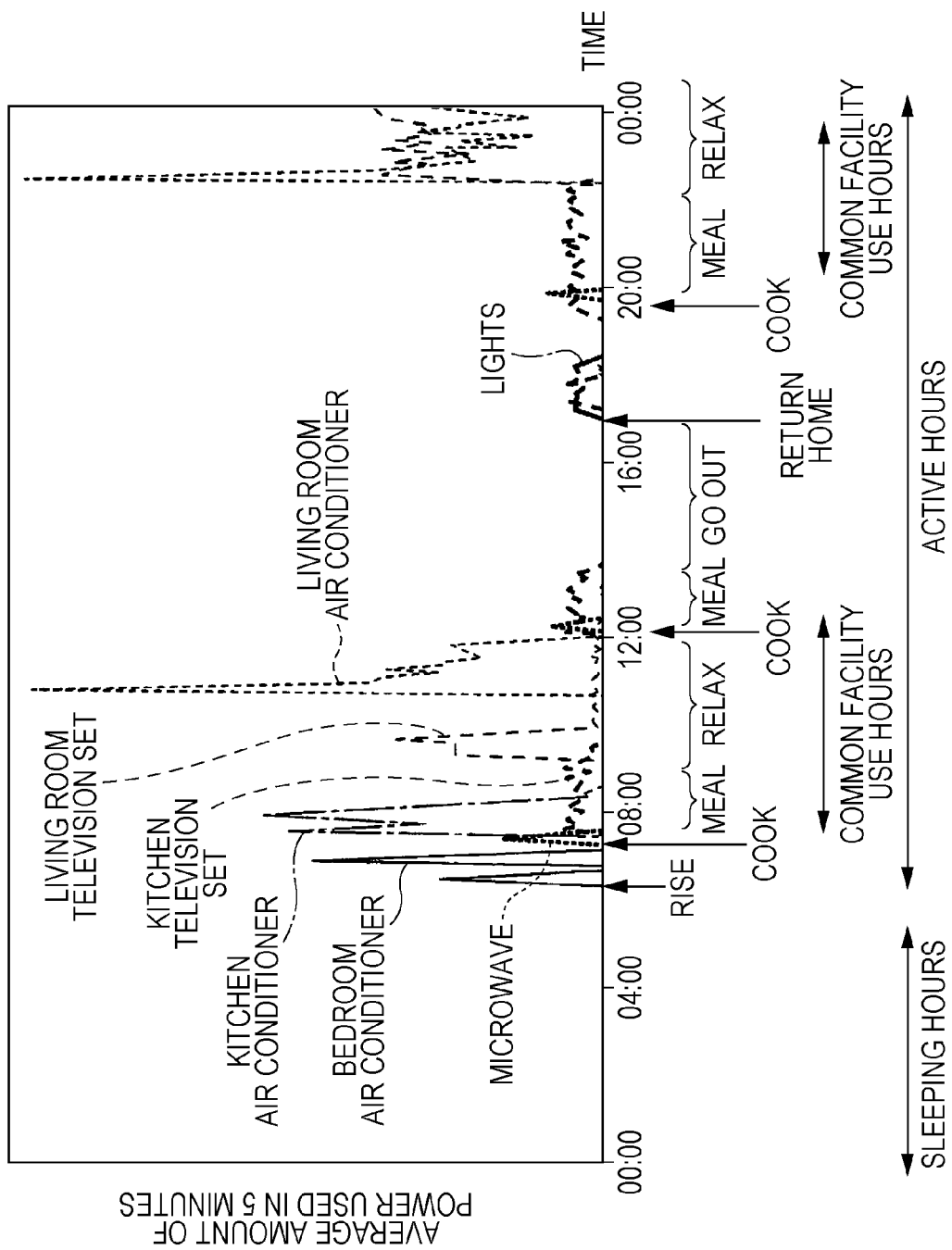
FIG. 6 is a diagram illustrating an example of a relationship between the power use patterns of the electrical devices and lifestyle patterns.

The resident information 224a is information regarding lifestyle patterns of residents of properties neighboring a candidate property. FIGS. 3 to 6 illustrate examples of the resident information 224a. FIG. 3 is a diagram illustrating an example of the resident information 224a. FIG. 4 is a diagram illustrating an example of a power use pattern. FIG. 5 is a diagram illustrating an example of power use patterns of electrical devices. FIG. 6 is a diagram illustrating an example of a relationship between the power use patterns of the electrical devices and lifestyle patterns.

As illustrated in FIG. 3, the resident information 224a includes person identifiers (IDs), property IDs, property information, time periods, power use data, device data, and lifestyle patterns.

Each person ID is identification information for identifying a resident. Each property ID is identification information for identifying a property. For example, a property ID "A_101" is an ID indicating Room 101 of Building A, and a property ID "B_101" is an ID indicating Room 101 of Building B.

The property information is information regarding a property identified by a property ID. For example, the property information includes information regarding a time spent by a resident of the property commuting. Each resident, a manager who has obtained information from residents, or the like registers property information in advance. The manager refers to a company or an individual who manages information regarding properties and residents of the properties, such as a real estate agent or an owner of the properties. Alternatively, information regarding a commuting time calculated on the basis of positional information regarding an office and a property input in advance may be registered as the information regarding a commuting time.

The time periods include, for example, start times and end times, which are 5 minutes later than the start times. The time periods are associated with, for example, the power use data, the device data, and the lifestyle patterns, which will be described later. Although the length of each time period is 5 minutes in FIG. 3, the length of each time period is not limited to this. The length of each time period may be any length such as 10 minutes, 1 hour, 1 day, 1 month, or 1 year.

The power use data indicates the amount of power used between a start time and an end time.

The power use data is received from the information providing apparatuses 200a to 200c. The power use pattern illustrated in FIG. 4 is specifically a graph indicating the amount of power used over time. The power use pattern illustrated in FIG. 4 is calculated, for example, using the times and the power use data illustrated in FIG. 3. As illustrated in FIG. 4, for example, the amount of power used changes over time. In FIG. 4, a horizontal axis represents time, and a vertical axis represents the amount of power used.

The device data is data regarding the amount of power used by each electrical device. FIG. 5 is a diagram illustrating an example of the power use patterns of the electrical devices. More specifically, FIG. 5 is a graph indicating the amount of power used by the electrical devices over time. The power use patterns of the electrical devices illustrated in FIG. 5 are calculated, for example, using the times and the device data illustrated in FIG. 3. As illustrated in FIG. 5, the amount of power used by the electrical devices, too, changes over time. An analysis section 225b, which will be described later, generates the device data.

The lifestyle patterns are information regarding lifestyle patterns of a resident of a property identified by a property ID. In each lifestyle pattern, at least one of activities such as going to bed, rising, going out, a meal, cooking, relaxing, returning home, and housework is associated with a time period.

For example, in the property whose property ID is "A_101", a circle in a field of a lifestyle pattern of "going to bed" corresponding to a time period "1:00 to 1:05" indicates that a resident of the property goes to bed in this time period. A circle in a field of a lifestyle pattern of "rising" corresponding to a time period "6:00 to 6:05" indicates that the resident of the property rises in this time period.

FIG. 6 is a diagram illustrating an example of a relationship between the power use patterns of the electrical devices and the lifestyle patterns.

FIG. 6 illustrates a relationship between the device data regarding a microwave, a bedroom air conditioner, a kitchen air conditioner, a kitchen television set, a living room television set, a living room air conditioner, and lights and the lifestyle patterns such as rising, cooking, a meal, relaxing, cooking, a meal, going out, and returning home.

In FIG. 2, the history information 224b is information regarding a history of properties where the applicant has lived in the past. FIG. 7 is a diagram illustrating an example of the history information 224b.

The history information 224b includes a person ID, property IDs, property information, time periods, power use data, device data, and lifestyle patterns.

Details of the person ID, the property IDs, the time periods, the power use data, the device data, and the lifestyle patterns have been described with reference to FIG. 3.

The property information is information regarding a property identified by a property ID. For example, the property information includes information regarding a period of residence and information regarding a commuting time, which indicates time taken for the applicant to commute from the property to the applicant's office. Details of the information regarding a commuting time have been described with reference to FIG. 3.

If a person identified by the person ID moves to a new property, information is added to the history information 224b. More specifically, a property ID, a period of residence, a commuting time, and the like included in property information, time periods, power use data, device data, and lifestyle patterns corresponding to the person ID in the resident information 224a illustrated in FIG. 3 are registered as a property ID, a period of residence, a commuting time, and the like included in property information, time periods, power use data, device data, and lifestyle patterns corresponding to the same person ID in the history information 224b illustrated in FIG. 7. The period of residence is also registered.

In FIG. 2, the control unit 225 includes an information obtaining section 225a, the analysis section 225b, and a determination section 225c.

The information obtaining section 225a obtains information regarding the amount of power used in neighboring properties from the information providing apparatuses 200a to 200c and registers the obtained information to the resident information 224a. The information obtaining section 225a also obtains lifestyle pattern information indicating the lifestyle patterns of the applicant from the terminal apparatus 210. If the person identified by the person ID in the resident information 224a moves to a new property, the information obtaining section 225a registers the information corresponding to the person to the history information 224b.

The analysis section 225b generates lifestyle pattern information indicating lifestyle patterns of residents of neighboring properties on the basis of the information regarding the amount of power used obtained by the information obtaining section 225a.

More specifically, the analysis section 225b reads the power use data from the resident information 224a stored in the storage unit 224 and estimates the power consumption of electrical devices using various methods proposed in the related art. The analysis section 225b then registers the estimated power consumption of electrical devices to the resident information 224a as device data.

Although the analysis section 225b estimates device data in the above description, the information providing apparatuses 200a to 200c may collect data regarding the power consumption of electrical devices and register the data to the resident information 224a as device data.

Next, the analysis section 225b estimates the lifestyle patterns of the residents on the basis of the device data. The analysis section 225b then registers information regarding the estimated lifestyle patterns to the resident information 224a.

More specifically, the analysis section 225b estimates the lifestyle patterns of the residents in accordance with a certain rule. For example, the analysis section 225b estimates a time period during the night in which the total power consumption of the electrical devices is lower than a certain value as sleeping hours of a resident and other time periods as active hours.

In addition, the analysis section 225b estimates a time at which an electrical device such as a bedroom air conditioner begins to operate as a time at which a resident rises and a time period in which a microwave is used as cooking time. The analysis section 225b estimates a time period in which a kitchen air conditioner and a kitchen television set are used as meal time and a time period in which the kitchen air conditioner and the kitchen television set are no longer used but a living room television set and a living room air conditioner are used as relaxing time.

In addition, the analysis section 225b estimates a time period in the daytime in which the total power consumption of the electrical devices is lower than a certain value as a time period in which a resident is out and a time period, after the time period in which the resident is out, at which electrical devices begin to operate as a time at which the resident returns home.

The determination section 225c compares the information regarding the lifestyle patterns of the applicant and information regarding lifestyle patterns of residents of neighboring properties with each other and determines the desirability of a combination of the applicant and a candidate property.

This determination method will be specifically described with reference to FIGS. 8A to 8C and 9A and 9B while taking sleeping hours of the applicant as an example of the lifestyle pattern. It is assumed in this example that the applicant does not want to be disturbed by household noises of the residents of the neighboring properties. It is desirable that while the applicant is asleep, the residents of the neighboring properties not be active. That is, a candidate property with which the sleeping hours of the applicant and sleeping hours of the residents of the neighboring properties match most closely is desirable.

FIGS. 8A and 8B are diagrams illustrating examples of a method for determining the desirability of a combination of an applicant and a candidate property. FIG. 8A illustrates sleeping hours of residents of properties neighboring a candidate property (property ID "A_202") in Building A. FIG. 8B illustrates sleeping hours of residents of properties neighboring a candidate property (property ID "B_201") in Building B. FIG. 8C is a diagram illustrating an example of the lifestyle patterns of the applicant.

Figure 9A:
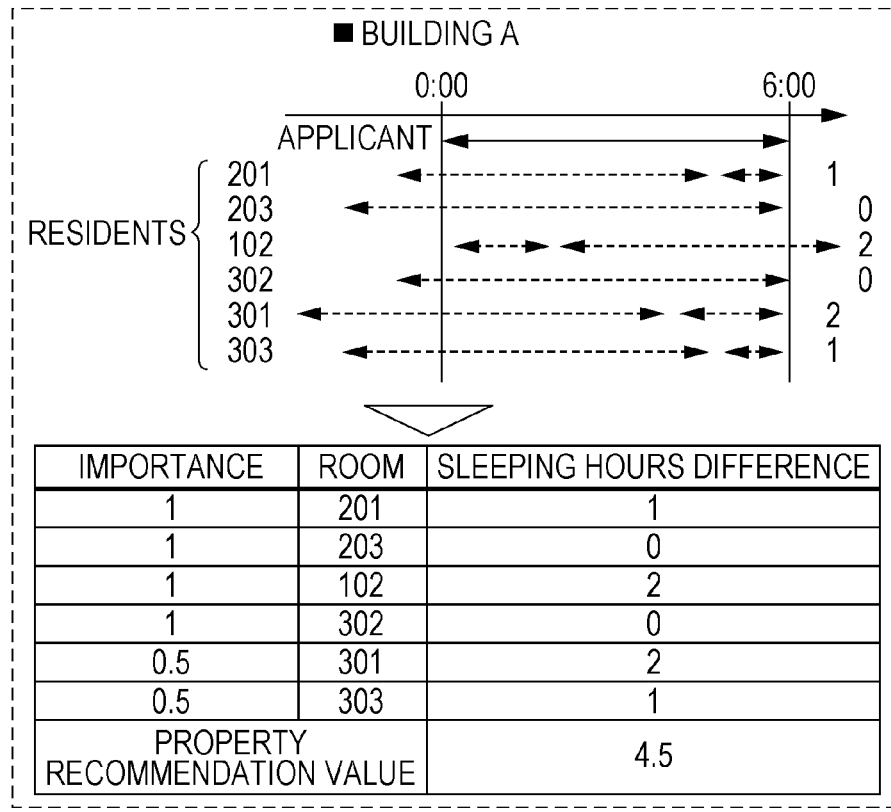
FIG. 9A is a diagram illustrating an example of a method for calculating a property recommendation value.
Figure 9B:
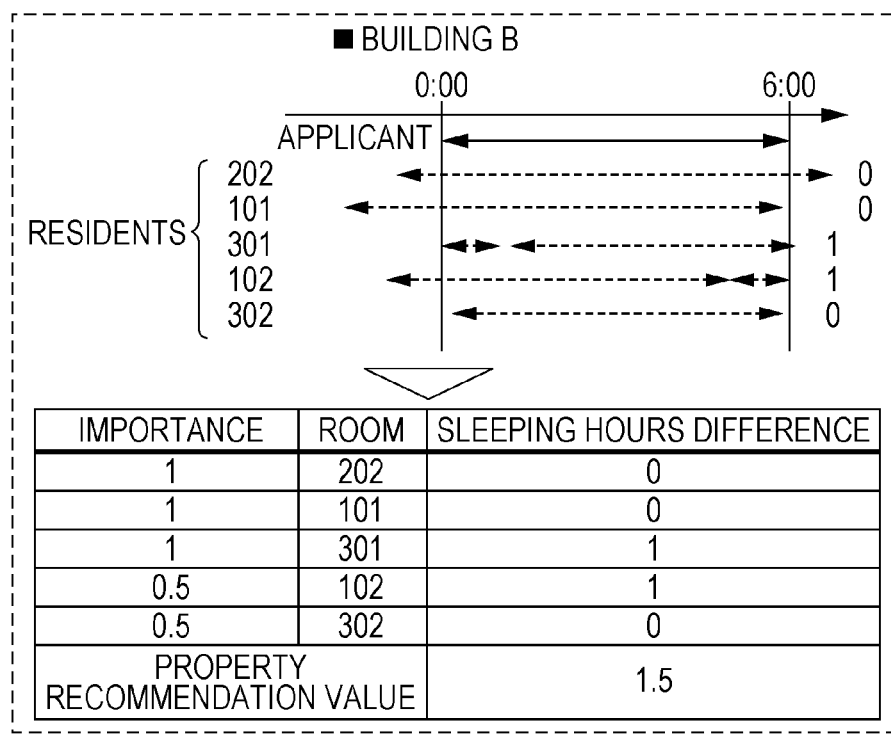
FIG. 9B is a diagram illustrating an example of the method for calculating a property recommendation value.

FIGS. 9A and 9B are diagrams illustrating examples of a method for calculating a property recommendation value. The property recommendation value is a value indicating the desirability of a combination of an applicant and a candidate property. FIG. 9A illustrates the method for calculating a property recommendation value of the property whose property ID is "A_202". FIG. 9B illustrates the method for calculating a property recommendation value of the property whose property ID is "B_201".

Numbers in "property number" fields illustrated in FIGS. 8A and 8B and numbers in "room" fields illustrated in FIGS. 9A and 9B correspond to property IDs. More specifically, for example, Room 02 in a second floor of Building A illustrated in FIG. 8A and Room 202 of Building A illustrated in FIG. 9A correspond to the property ID "A_202".

An upper part of FIG. 9A illustrates a comparison between sleeping hours of residents of properties neighboring the property whose property ID is "A_202" illustrated in FIG. 8A and the sleeping hours of the applicant. A lower part of FIG. 9A illustrates differences between the sleeping hours and the property recommendation value.

In the example illustrated in FIG. 9A, a difference between the sleeping hours of the applicant and the sleeping hours of the resident of Room 201 is 1 hour. Because, as illustrated in FIG. 8A, Room 201 is a property adjacent to the candidate property, a degree of importance is set to 1. Room 301 is a property neighboring the candidate property, but because Room 301 is not an adjacent property, the degree of importance is set lower than 1, namely 0.5.

Although the degrees of importance are set on the basis of positions of the neighboring properties relative to the candidate property, the degrees of importance may be set in accordance with the thickness of walls or the like, instead.

The determination section 225c calculates the property recommendation value by adding all values obtained by multiplying the differences between the sleeping hours by the degrees of importance. In the example illustrated in FIG. 9A, the property recommendation value of the candidate property whose property ID is "A_202" is 4.5. In the example illustrated in FIG. 9B, the property recommendation value of the candidate property whose property ID is "B_201" is 1.5.

If a property recommendation value is larger than a certain value, differences between the sleeping hours of the applicant and sleeping hours of residents of neighboring properties are large, that is, the sleeping hours do not match well. A property whose property recommendation value is larger than the certain value is therefore removed from candidate properties since a combination of the applicant and the property is undesirable.

If a property recommendation value is smaller than the certain value, differences between the sleeping hours of an applicant and sleeping hours of residents of neighboring properties are small, that is, the sleeping hours match well. The determination section 225c therefore compares property recommendation values of candidate properties obtained in this manner with one another and determines that a combination of the applicant and a candidate property whose property recommendation value is the smallest is the most desirable.

In the above description, the property recommendation value is calculated on the basis of differences in a lifestyle pattern. By using a lifestyle pattern in this manner, the desirability of a combination of an applicant and a property can be appropriately determined.

Now, an example of a procedure of a process for determining the desirability of a combination performed by the server apparatus 220 will be described. FIG. 10 is a flowchart illustrating an example of the procedure of the process for determining the desirability of a combination performed by the server apparatus 220.

First, the information obtaining section 225a of the server apparatus 220 obtains, from the information providing apparatuses 200a to 200c, information regarding the amount of power used in neighboring properties in an apartment house in which a candidate property exists (step ST100).

The analysis section 225b analyzes the amount of power used to calculate the amount of power used by each device (ST101). The analysis section 225b then estimates lifestyle patterns of residents of the neighboring properties on the basis of the amount of power used by electrical devices (ST102).

The determination section 225c compares the lifestyle patterns of the residents of the neighboring properties and lifestyle patterns of an applicant with each other to calculate a property recommendation value of the candidate property (ST103).

The determination section 225c then determines a recommendation ranking of the candidate property on the basis of the property recommendation value (ST104).

In the above description, the applicant inputs information regarding the lifestyle patterns thereof using the input unit 211 of the terminal apparatus 210. The information regarding the lifestyle patterns input by the applicant using the terminal apparatus 210 is, for example, transmitted to the server apparatus 220 and stored in the storage unit 224. When the flowchart illustrated in FIG. 10 is executed, the storage unit 224 reads the information regarding the lifestyle patterns input by the applicant as necessary.

As a result, even if the applicant moves to the candidate property and the lifestyle patterns of the applicant greatly change, the desirability of a combination can be effectively determined. In the following description, a case in which the server apparatus 220 estimates lifestyle patterns of an applicant on the basis of past changes in lifestyle patterns of the applicant after the applicant moved to a new property will be described with reference to FIGS. 11 and 12.

Figure 12:
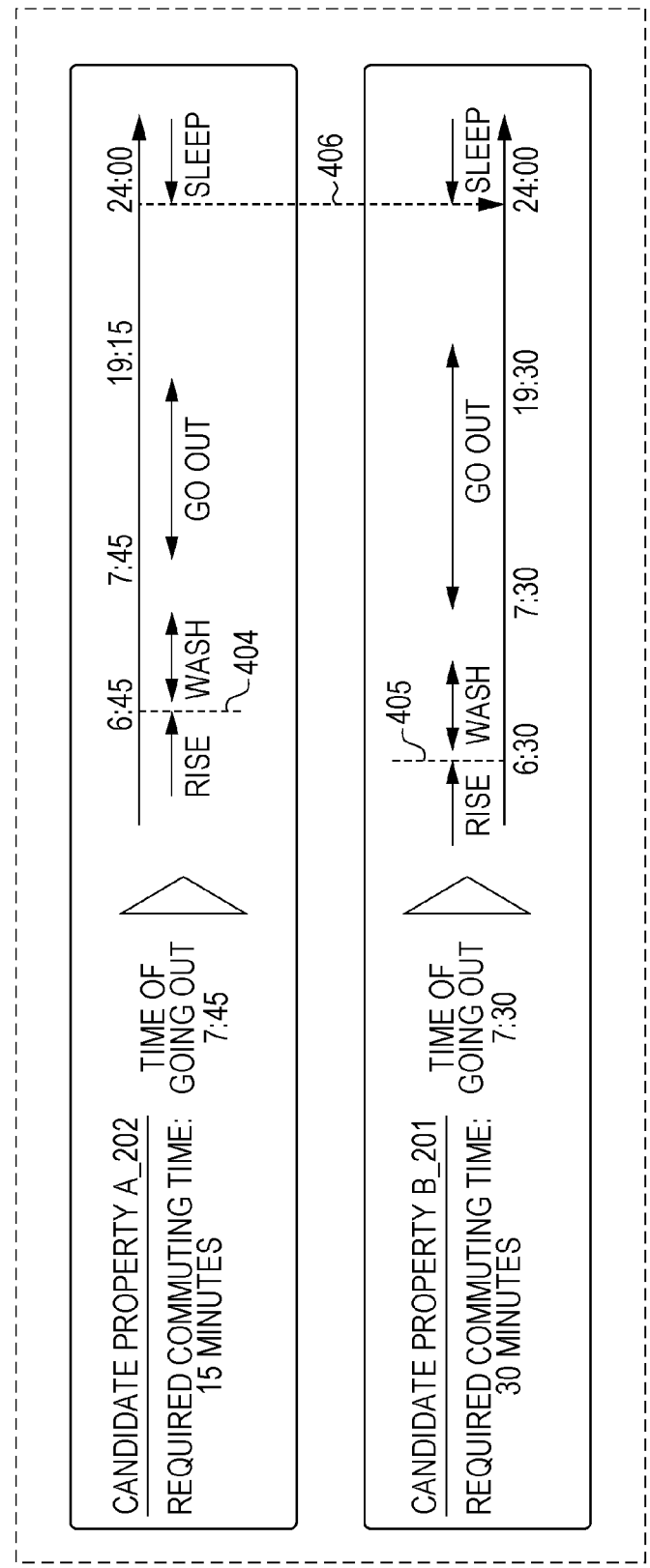
FIG. 12 is a diagram illustrating an example of results of estimation of lifestyle patterns of the applicant in candidate properties.

FIG. 11 is a diagram illustrating an example of past changes in lifestyle patterns of the applicant after an applicant moved to a new property. FIG. 12 is a diagram illustrating an example of results of estimation of the lifestyle patterns of the applicant in candidate properties.

FIGS. 11 and 12 illustrate an example in which lifestyle patterns of an applicant corresponding to a person ID "M_100" illustrated in FIG. 7 in the candidate properties corresponding to the property IDs "A_202" and "B_201" are estimated when the applicant used to live in properties corresponding to property IDs "X_201" and "Y_302".

An upper part of FIG. 11 schematically illustrates lifestyle patterns of the applicant corresponding to the person ID "M_100" at a time when the applicant used to live in the property corresponding to the property ID "X_201". A lower part of FIG. 11 schematically illustrates lifestyle patterns of the applicant corresponding to the person ID "M_100" at a time when the applicant used to live in the property corresponding to the property ID "Y_302".

In FIG. 11, periods of residence and commuting times are information registered in the history information 224b illustrated in FIG. 7 as property information. Time periods of rising, washing, going out, and sleep are information registered in the history information 224b as information regarding lifestyle patterns.

First, the analysis section 225b identifies lifestyle patterns that changed after the applicant moved from the property X_201 to the property Y_302 and lifestyle patterns that did not change.

As illustrated in FIG. 11, for example, after the applicant moved from the property X_201 to the property Y_302, the commuting time changed from 1 hour to 1.5 hour. As a result, the time period of washing was advanced by 0.5 hour, and the time period of going out increased by 1 hour, with a beginning of the time period of going out being advanced by 0.5 hour and an end being delayed by 0.5 hour. That is, a time at which the applicant goes out was advanced from 7:00 to 6:30, and a time at which the applicant returns home was delayed from 20:00 to 20:30. These changes are considered based on the difference in commuting time.

On the other hand, as indicated by broken lines 401, the applicant would still do the washing after the rising. As indicated by a broken line 402, the applicant would still take 1 hour to go out after the rising. As indicated by a broken line 403, the applicant would still fall asleep at 24:00. It can be estimated that these lifestyle patterns do not change even after the applicant moves to a candidate property.

The analysis section 225b therefore estimates the lifestyle patterns of the applicant after the applicant moves to a candidate property on the basis of the past lifestyle patterns. FIG. 12 is a diagram illustrating an example of the results of the estimation of the lifestyle patterns of the applicant in the candidate properties.

An upper part of FIG. 12 illustrates a result of estimation of the lifestyle patterns of the applicant after the applicant moves to the candidate property whose property ID is "A_202". A lower part of FIG. 12 illustrates a result of estimation of the lifestyle patterns of the applicant after the applicant moves to the candidate property whose property ID is "B_201".

First, the analysis section 225b obtains information regarding commuting time of the applicant after the applicant moves to a candidate property. The applicant or the manager who has obtained the information may register the information regarding commuting time in advance. Alternatively, the information regarding commuting time may be calculated on the basis of positional information regarding an office and the candidate property and information regarding a means of transportation input in advance.

In FIG. 12, the commuting times of the applicant after the applicant moves to the candidate property whose property ID is "A_202" and after the applicant moves to the candidate property whose property ID is "B_201" are 15 minutes and 30 minutes, respectively.

Because the commuting time of the applicant in the candidate property whose property ID is "A_202" is 1.25 hours shorter than the commuting time of the applicant in the property Y_302, the analysis section 225b estimates that a time 404 of rising will be 6:45, which is 1.25 hours later than a time of rising in the property Y_302.

Similarly, because the commuting time of the applicant in the candidate property whose property ID is "B_201" is 1 hour shorter than the commuting time of the applicant in the property Y_302, the analysis section 225b estimates that a time 405 of rising will be 6:30, which is 1 hour later than the time of rising in the property Y_302.

Similarly, the control unit 225 estimates that the time period of washing in the candidate whose property ID is "A_202" will be 1.25 hours later than the time period of washing in the property Y_302 and that the time period of washing in the candidate whose property ID is "B_201" will be 1 hour later than the time period of washing in the property Y_302.

With respect to the time period of going out, the analysis section 225b estimates that the time period of going out in the candidate property whose property ID is "A_202" will be 2.5 hours shorter than the time period of going out in the property Y_302 and that the time period of going out in the candidate property whose property ID is "B_201" will be 2 hour shorter than the time period of going out in the property Y_302. The analysis section 225b also estimates that a time 406 at which the applicant falls asleep will remain at 24:00.

By estimating the lifestyle patterns in this manner, it is possible to prevent the applicant from unintentionally input incorrect lifestyle patterns. Since the lifestyle patterns can be automatically obtained, the applicant need not input information and can find appropriate candidate properties.

Next, a case will be described in which the property recommendation value of each candidate property is calculated from results of the above-described estimation of lifestyle patterns. FIGS. 13A and 13B are diagrams illustrating examples of the method for calculating a property estimation value. FIG. 13A illustrates the method for calculating the property recommendation value of the candidate property whose property ID is "A_202". FIG. 13B illustrates the method for calculating the property recommendation value of the candidate property whose property ID is "B_201".

The method for calculating a property recommendation value is the same as that described with reference to FIGS. 8A to 8C and 9A and 9B, and accordingly description thereof is omitted. In the calculation method described with reference to FIGS. 8A to 8C and 9A and 9B, however, the property recommendation value is calculated on the basis of information regarding sleeping hours input by the applicant. If the sleep hours differ between candidate properties in accordance with the commuting time, the applicant needs to input information regarding sleeping hours for each candidate property.

On the other hand, in the calculation method described with reference to FIGS. 13A and 13B, lifestyle patterns are estimated for each candidate property. The applicant therefore need not input information regarding sleeping hours and can obtain a more reliable property recommendation value.

Figure 14A:
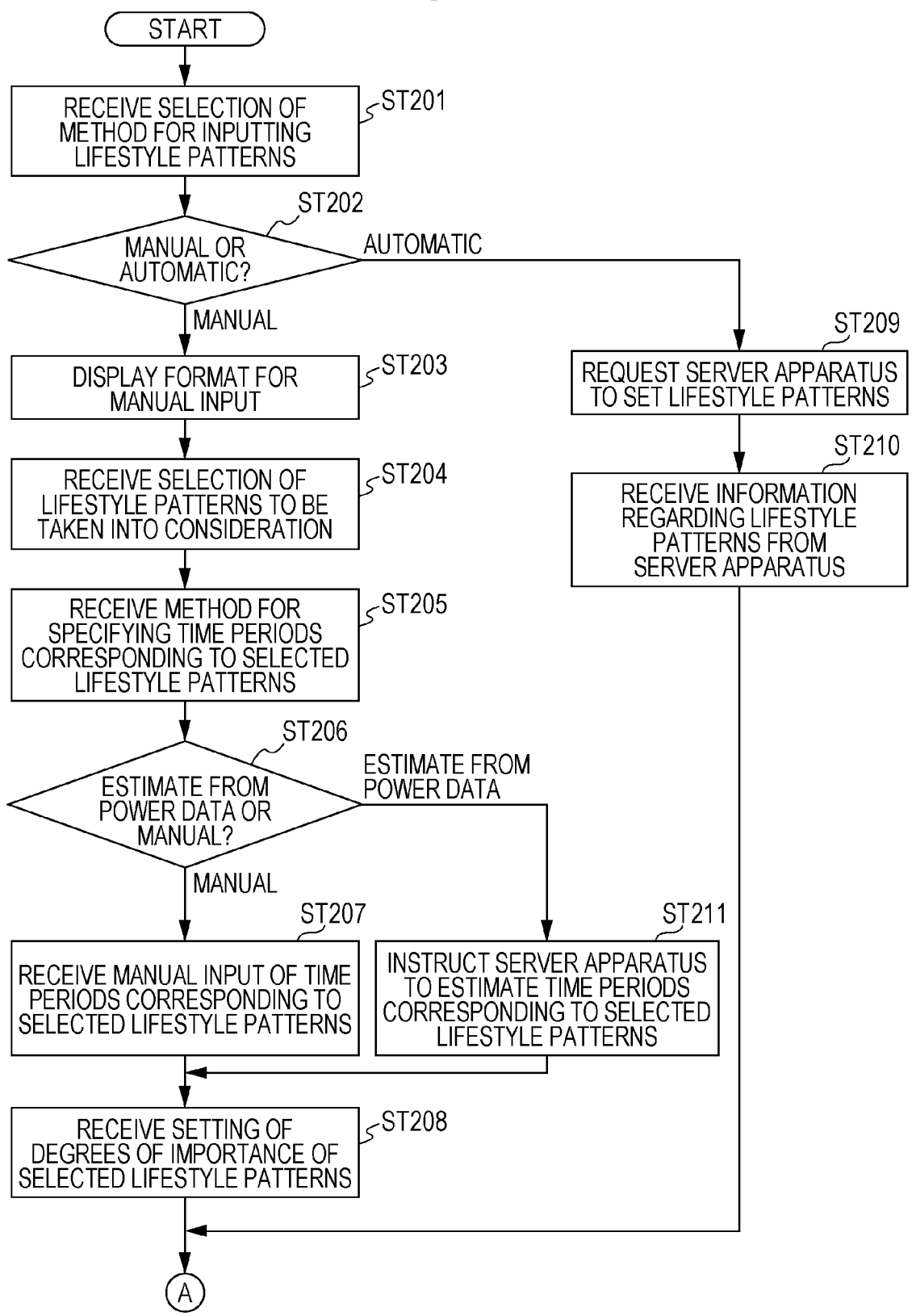
FIG. 14A is a flowchart illustrating an example of a procedure of a process for inputting and outputting property search information performed by a terminal apparatus.
Figure 14B:
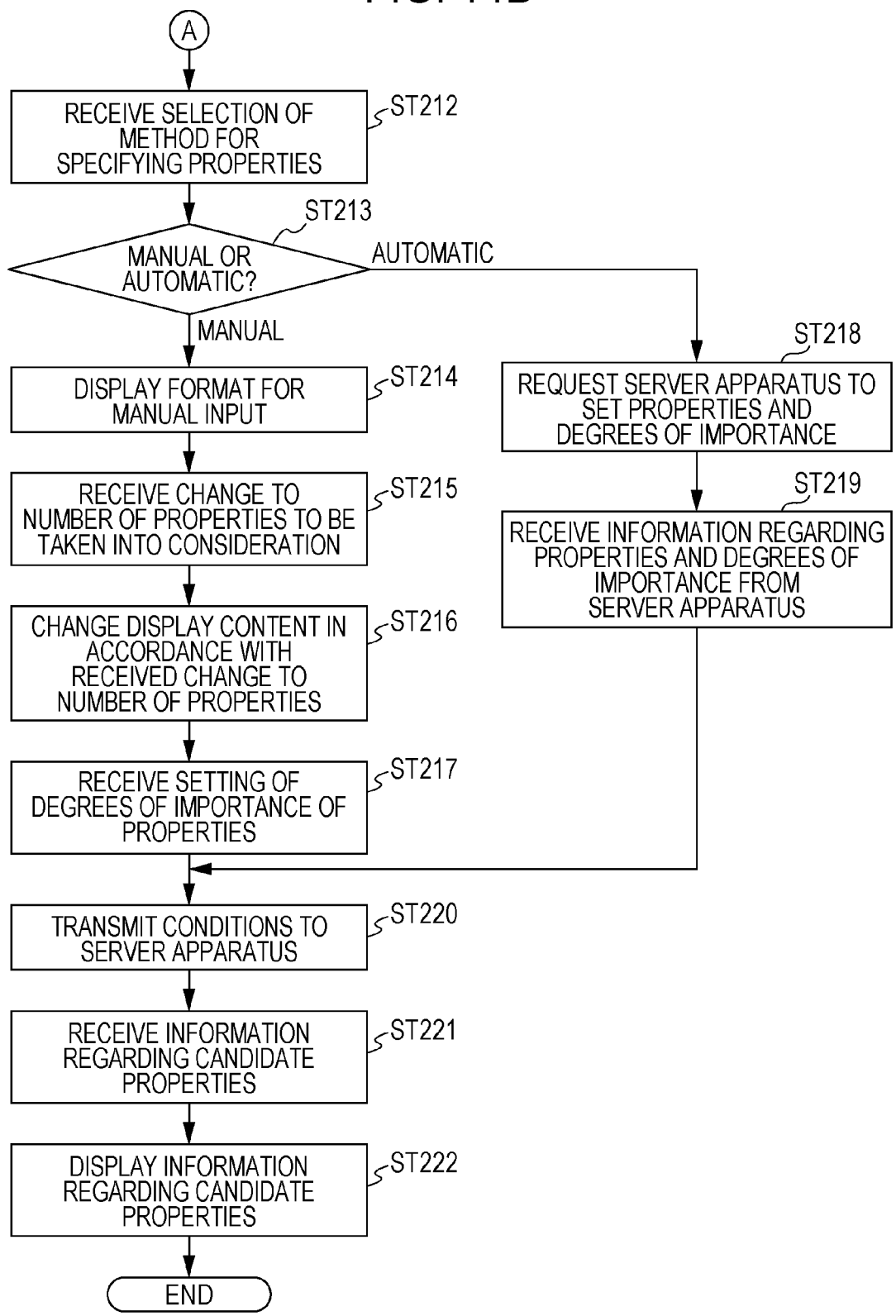
FIG. 14B is a flowchart illustrating the example of the procedure of the process for inputting and outputting property search information performed by the terminal apparatus.

Next, a procedure of a process for inputting and outputting property search information performed by the terminal apparatus 210 will be described. FIGS. 14A and 14B are flowcharts illustrating an example of the procedure of the process for inputting and outputting property search information performed by the terminal apparatus 210.

Figure 15A:
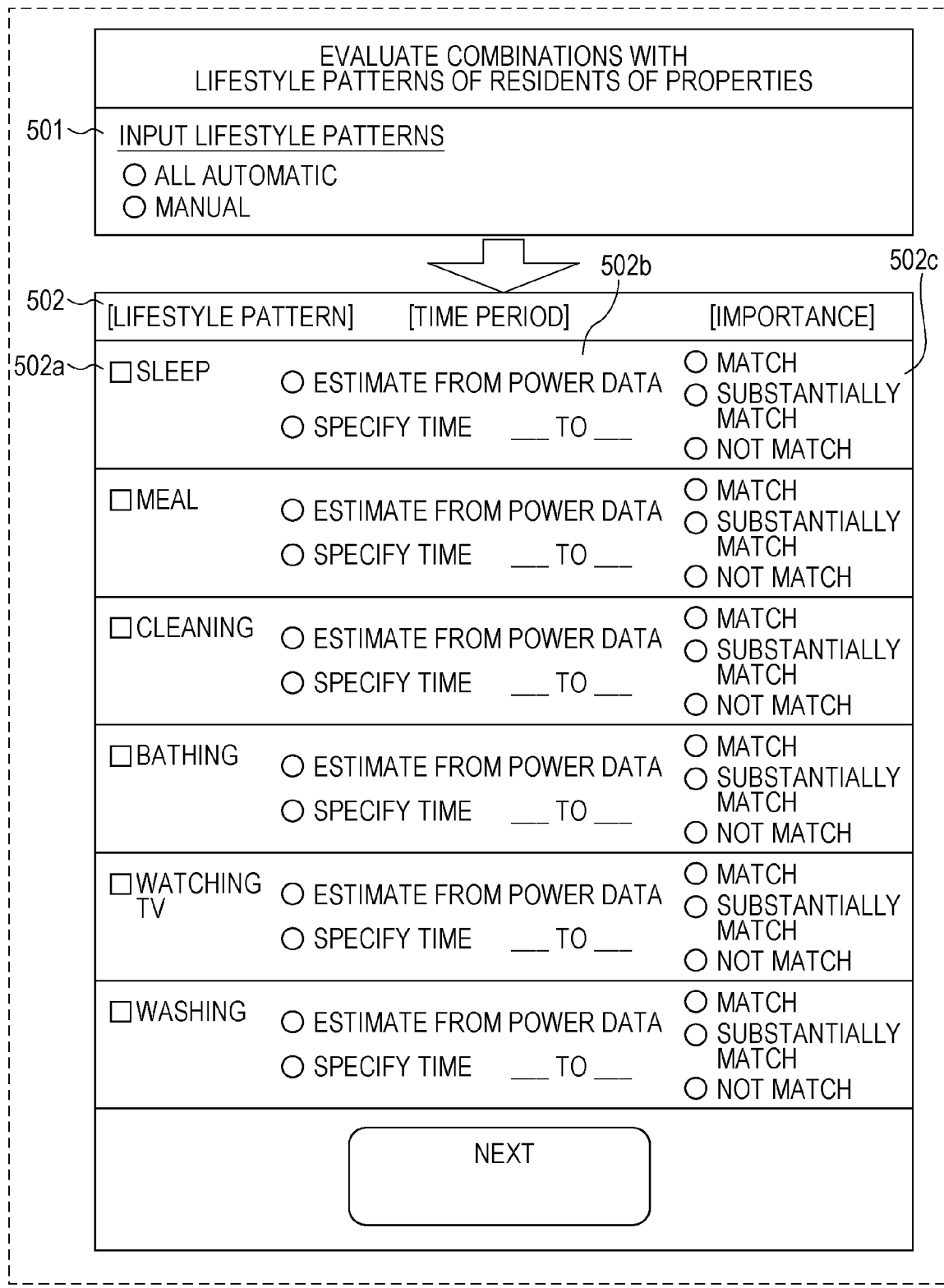
FIG. 15A is a diagram illustrating an example of a user interface displayed on the terminal apparatus.
Figure 15B:
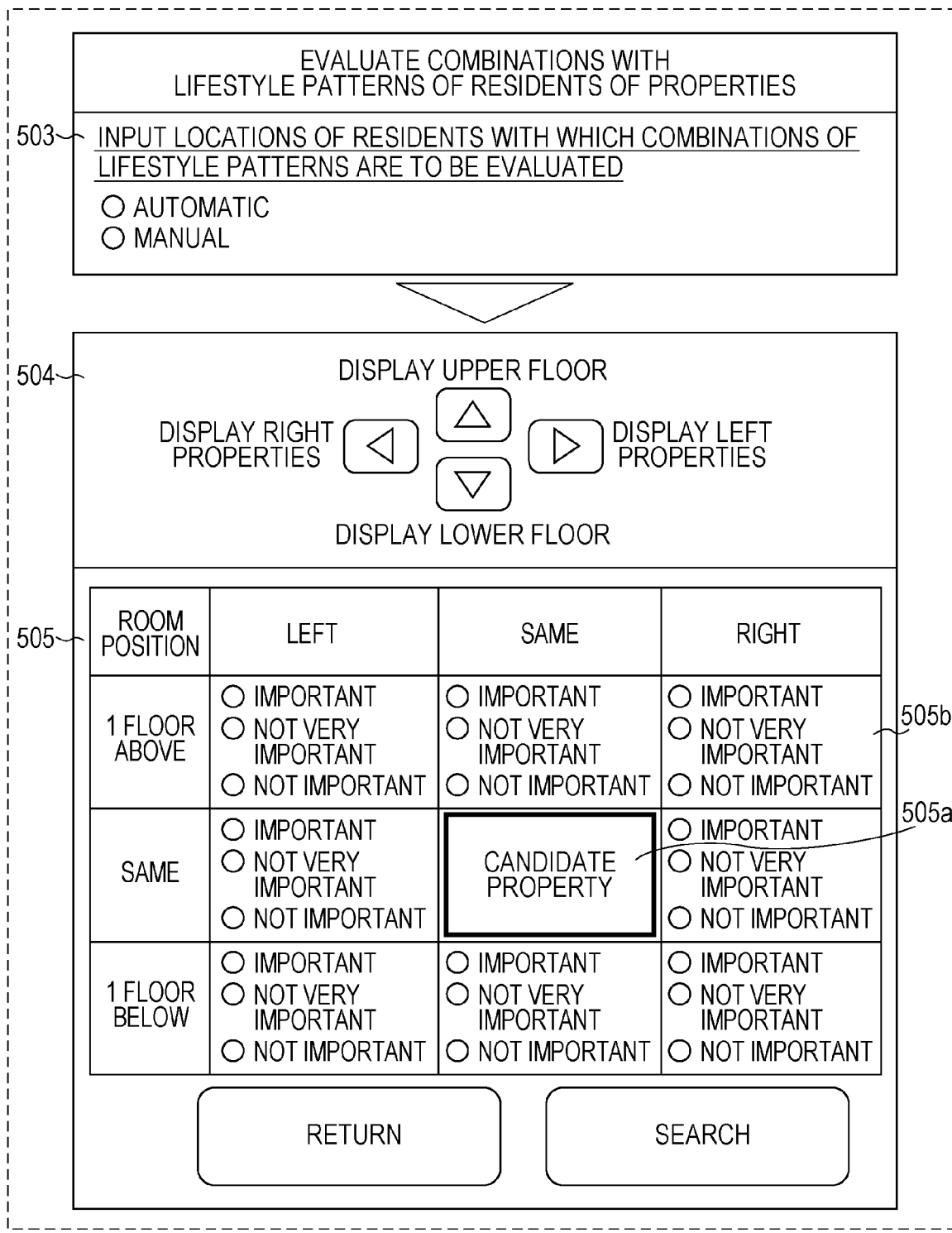
FIG. 15B is a diagram illustrating an example of a user interface displayed on the terminal apparatus.

FIGS. 15A to 15C are diagrams illustrating examples of user interfaces (UIs) displayed on the terminal apparatus 210.

First, the input unit 211 of the terminal apparatus 210 receives selection of a method for inputting lifestyle pattern information from the applicant (ST201).

More specifically, the control unit 215 controls the display unit 212 to cause the display unit 212 to display an input method selection screen 501 illustrated in FIG. 15A. The input unit 211 then receives selection of manual input ("manual" illustrated in FIG. 15A) of lifestyle pattern information or automatic input ("all automatic" illustrated in FIG. 15A) of lifestyle pattern information from the applicant.

The control unit 215 determines whether the selection received by the input unit 211 is manual input or automatic input (ST202). More specifically, the control unit 215 determines whether the applicant checks an "all automatic" box or a "manual" box in the input method selection screen 501 by operating the input unit 211.

If the applicant selects "manual", the control unit 215 controls the display unit 212 to cause the display unit 212 to display a manual input format 502 (ST203).

The input unit 211 then receives, from the applicant, selection of lifestyle patterns to be taken into consideration in determinations of the desirability of combinations (ST204). More specifically, the input unit 211 receives, from the applicant, selection of lifestyle patterns 502a included in the manual input format 502.

Next, the input unit 211 receives selection of a method for specifying a time period for each of the selected lifestyle patterns (ST205). More specifically, the input unit 211 receives, from the applicant, selection of "estimate from power data" or "specify time" in a method selection area 502b included in the manual input format 502.

The control unit 215 then determines whether the selection received by the input unit 211 is "estimate from power data" or "specify time" (manual) (ST206).

If "specify time" (manual) is selected, the control unit 215 receives, from the applicant, in the method selection area 502b, a time period in which each of the selected lifestyle patterns is performed (ST207). Although the time period that can be input in the method selection area 502b can be incremented by 1 hour in FIG. 15A, the time period may be incremented by, for example, 30 minutes or 1 minute, instead.

If "estimate from power data" is selected in ST206, the control unit 215 instructs the server apparatus 220 to estimate a time period in which each of the selected lifestyle patterns is performed (ST211).

At this time, the control unit 215 transmits a person ID of the applicant to the server apparatus 220. For example, the applicant inputs the person ID in advance.

After being instructed to estimate a time period, the server apparatus 220 estimates a time period of the applicant specified by the person ID, that is, a time period in which the applicant performs each of the selected lifestyle patterns, using the method described with reference to FIGS. 11 and 12.

After the processing in ST207 or ST211, the input unit 211 receives setting of degrees of importance of the lifestyle patterns selected in ST204 (ST208). More specifically, the input unit 211 receives selection of "match", "substantially match", or "not match" in an importance selection area 502c illustrated in FIG. 15A.

Although selection or one of the three options, namely "match", "substantially match", and "not match", is received in the importance selection area 502c, the number of options need not be 3, and degrees of importance may be set as a percentage, instead.

In this case, the applicant may manually input a value, or may select one of a plurality of values. Alternatively, a slide bar for specifying a value may be displayed and the applicant may operate the slide bar to specify a value.

If "all automatic" is selected in ST202 as a method for inputting lifestyle patterns, the control unit 215 instructs the server apparatus 220 to automatically select lifestyle patterns to be taken into consideration in the determinations of the desirability of combinations and set the lifestyle patterns of the applicant and degrees of importance at a time when the lifestyle patterns are taken into consideration (ST209). The instruction includes information regarding the person ID of the applicant.

The applicant may input the person ID in advance, or if "all automatic" is selected in ST202, a screen for inputting a person ID may be displayed to enable the applicant to input the person ID.

It is assumed in this case that the storage unit 224 of the server apparatus 220 stores history information indicating lifestyle patterns taken into consideration in past determinations of the desirability of combinations made by various applicants and degrees of importance given to the lifestyle patterns.

After being instructed to select lifestyle patterns, the analysis section 225b of the server apparatus 220 refers to the history information and, for example, selects lifestyle patterns that have been selected more than a certain number of times as the lifestyle patterns to be taken into consideration.

The analysis section 225b selects an average of degrees of importance selected in the past or a modal degree of importance as a degree of importance to be used in the current determinations of the desirability of combinations. The analysis section 225b estimates the lifestyle patterns of the applicant using the method described with reference to FIGS. 11 and 12.

The communication unit 213 of the terminal apparatus 210 then receives selection information regarding lifestyle patterns transmitted from the server apparatus 220 (ST210). The information transmitted from the server apparatus 220 may include information regarding the lifestyle patterns to be taken into consideration selected by the server apparatus 220 and information regarding the degree of importance. These pieces of information are displayed on the display unit 212 in accordance with a check request from the applicant.

After the processing in ST208 or ST210, the input unit 211 receives, as illustrated in FIG. 14B, selection of a method for specifying neighboring properties to be taken into consideration in the determinations of the desirability of combinations (ST212). More specifically, the input unit 211 receives selection of a method for specifying neighboring properties in a method selection area 503.

The control unit 215 then determines whether the selection received by the input unit 211 is "manual" or "automatic" (ST213). More specifically, the control unit 215 determines whether the applicant selects "manual" or "automatic" in the method selection area 503.

If "manual" is selected, the control unit 215 controls the display unit 212 to cause the display unit 212 to display a manual input format 504 and a property display area 505 (ST214).

Next, the input unit 211 receives a change to the number of neighboring properties to be taken into consideration (ST215). More specifically, the input unit 211 receives a change to the number of neighboring properties input by the applicant in the manual input format 504.

The control unit 215 then controls the display unit 212 in such a way as to change display content in the property display area 505 in accordance with the change to the number of neighboring properties (ST216). In the property display area 505, for example, eight properties are displayed around a candidate property 505a by default.

In this state, if, for example, the applicant selects "display upper floor" in the manual input format 504, "2 floors above" is added to the property display area 505, and the property display area 505 is displayed such that a total of 11 properties are displayed.

Although the property display area 505 illustrated in FIG. 15B is displayed as a table, the property display area 505 is not limited to a table. Properties may be itemized, instead, insofar as the properties can be specified.

The input unit 211 then receives setting of degrees of importance of the properties displayed in the property display area 505 (ST217). In the example illustrated in FIG. 15B, the applicant can set each degree of importance to one of three levels, namely "important", "not very important", and "not important".

The degrees of importance set here correspond to the degrees of importance of the neighboring properties illustrated in FIGS. 9A and 9B. For example, the degree of importance of "important" and the degree of importance of "not very important" set by the applicant correspond to the degree of importance of 1 and the degree of importance of 0.5, respectively, illustrated in FIGS. 9A and 9B. If the degree of importance of "not important" set by the applicant corresponds to the degree of importance of 0. A property for which "not important" is set, therefore, is not taken into consideration in calculation of a property recommendation value.

Although the applicant can select one of the three levels of importance in the property display area 505 illustrated in FIG. 15B, the applicant may set each degree of importance in a different manner. For example, the applicant may set each degree of importance as a percentage, instead.

In this case, the applicant may manually input a value, or may select one of a plurality of values. Alternatively, a slide bar for specifying a value may be displayed and the applicant may operate the slide bar to specify a value.

On the other hand, if "automatic" is selected in ST213, the control unit 215 instructs the server apparatus 220 to select lifestyle patterns to be taken into consideration and set the degrees of importance (ST218).

It is assumed in this case that the storage unit 224 of the server apparatus 220 stores history information indicating lifestyle patterns taken into consideration in past determinations of the desirability of combinations made by various applicants and degrees of importance given to neighboring properties.

After being instructed to select lifestyle patterns, the analysis section 225b of the server apparatus 220 refers to the history information and selects neighboring properties that have been selected more than a certain number of times. The analysis section 225b selects an average of degrees of importance selected in the past or a modal degree of importance as a degree of importance to be used in the current determinations of the desirability of combinations.

The communication unit 213 of the terminal apparatus 210 then receives selection information regarding neighboring properties transmitted from the server apparatus 220 and degrees of importance (ST219). This information is displayed on the display unit 212 in accordance with a check request from the applicant.

After the processing in ST217 or ST219, the control unit 215 of the terminal apparatus 210 transmits, to the server apparatus 220, various pieces of information received by the applicant from the input unit 211 in the above-described process as conditions under which the desirability of combinations is determined (ST220). If "all automatic" is selected in ST202 and "automatic" is selected in ST213, only a request to determine the desirability of combinations is transmitted to the server apparatus 220.

Upon receiving the various pieces of information from the terminal apparatus 210, the server apparatus 220 performs a process for determining the desirability of combinations and transmits information regarding candidate properties suitable for the applicant to the terminal apparatus 210. More specifically, the determination section 225c of the server apparatus 220 calculates property recommendation values using the method described with reference to FIGS. 8A to 8C and 9A and 9B.

The determination section 225c then extracts a certain number of candidate properties whose property recommendation values are smallest as candidate properties suitable for the applicant and transmits information regarding the candidate properties to the terminal apparatus 210.

Although a lifestyle pattern to be taken into consideration is only "sleep" in FIGS. 8A to 8C and 9A and 9B, a plurality of lifestyle patterns may be selected as lifestyle patterns to be taken into consideration, instead, as illustrated in FIG. 15A. A process for determining the desirability of combinations performed by the determination section 225c of the server apparatus 220 in this case will be described hereinafter.

For example, it is assumed that in the manual input format 502 illustrated in FIG. 15A, "sleep" and "washing" are selected as lifestyle patterns to be taken into consideration. In addition, "match" is selected as a degree of importance of "sleep" and "not match" is selected as a degree of importance of "washing". It is assumed here that there is a washing machine or a clothes drying area for common use in a building and the applicant desires that his/her washing time is different from those of other residents.

If the determination section 225c makes it a condition of the determinations of the desirability of combinations that the applicant's washing time is different from those of the other residents, first, the determination section 225c calculates a time period in which the applicant's washing time overlaps those of the other residents.

The determination section 225c then adds all values obtained by multiplying the calculated overlap time period by degrees of importance of neighboring properties described with reference to FIGS. 8A and 8B to calculate a property recommendation value under a condition that the applicant's washing time is different from those of the other residents. In this case, a smaller property recommendation value indicates that the applicant's washing time is more significantly different from those of the other residents. That is, as with the case described with reference to FIGS. 8A to 8C and 9A and 9B, a smaller property recommendation value indicates a more desirable combination of a candidate property and the applicant, who desires that his/her washing time is different from those of the other residents.

Next, the determination section 225c adds the property recommendation value under the condition that the applicant's washing time is different from those of the other residents to a property recommendation value under a condition that the applicant's sleeping hours are the same as those of the other residents. A property recommendation value for determining the desirability of combinations under these two conditions can thus be calculated.

The determination section 225c then extracts a certain number of candidate properties whose property recommendation values calculated under the two conditions are smallest and transmits information regarding the obtained candidate properties to the terminal apparatus 210.

Although a case in which property recommendation values calculated under two conditions are added has been described, weightings may be set for the property recommendation values to adjust degrees of importance of the conditions, instead.

For example, it is assumed that in the manual input format 502 illustrated in FIG. 15A, "match" is selected as a degree of importance of "sleep" and "substantially match" is selected as a degree of importance of "meal".

In this case, a weighting for a property recommendation value obtained on the basis of "meal", for which "substantially match" has been selected, is smaller than a weighting for a property recommendation value obtained on the basis of "sleep", for which "match" has been selected. By adding these property recommendation values multiplied by the weightings, a final property recommendation value is calculated.

As a result, if the applicant does not give priority to a condition that the applicant's meal time is the same as those of the other residents over a condition that the applicant's sleeping hours are the same as those of the other residents, the property recommendation value can be calculated in consideration of the applicant's intention.

Appropriate determinations of the desirability of combinations can thus be made even if two or more lifestyle patterns are selected in the processing in ST204, ST205, ST207, and ST208 as lifestyle patterns to be taken into consideration and different degrees of importance are set for the lifestyle patterns.

The communication unit 213 of the terminal apparatus 210 then receives the information regarding the candidate properties transmitted from the server apparatus 220 as results of the determinations of the desirability of combinations (ST221).

The display unit 212 then displays the results of the determinations of the desirability of combinations received from the server apparatus 220 (ST222). FIG. 15C is a diagram illustrating an example of a display screen 506 for results of determinations of the desirability of combinations.

In the display screen 506, information regarding candidate properties are displayed in order of ascending property recommendation value. As illustrated in FIG. 15C, information indicating how closely the lifestyle patterns of the applicant, such as sleeping hours, match those of residents of properties neighboring each candidate property may be displayed. Such a degree of matching can be easily obtained by calculating how closely the applicant's sleeping hours match average sleeping hours of the residents of the neighboring properties.

An outline of each candidate property may be displayed as well. The storage unit 224 of the server apparatus 220 may store information regarding the outline in advance. After receiving the information from the server apparatus 220, the display unit 212 of the terminal apparatus 210 may display the information.

As described above, the determination section 225c determines a degree of matching between the applicant's lifestyle patterns and those of residents of neighboring properties. If the degree of matching is higher than a certain value, the determination section 225c determines that a combination of the applicant and a candidate property is desirable, and if the degree of matching is lower than the certain value, the determination section 225c determines that a combination of the applicant and a candidate property is undesirable.

The desirability of combinations can thus be determined in accordance with the applicant's intention, thereby providing more appropriate candidate properties for the applicant.

Alternatively, after determining a degree of matching between the applicant's lifestyle patterns and those of residents of neighboring properties, the determination section 225c may determine that a combination of the applicant and a candidate property is undesirable if the degree of matching is higher than a certain value, and determine that a combination of the applicant and a candidate property is desirable if the degree of matching is lower than the certain value.

For example, as described above, the determination section 225c may determine a degree of matching between the applicant's washing time and those of residents of neighboring properties. If the degree of matching is higher than a certain value, the determination section 225c may determine that a combination of the applicant and a candidate property is undesirable, and if the degree of matching is lower than the certain value, the determination section 225c may determine that a combination of the applicant and a candidate property is desirable.

Although lifestyle patterns of an applicant and residents of neighboring properties are estimated from information regarding power use patterns of the applicant and the residents of the neighboring properties and a property recommendation value of a candidate property is calculated by comparing the estimated lifestyle patterns with each other in the first embodiment, a property recommendation value of a candidate property may be calculated by comparing power use patterns with each other, instead.

For example, if the applicant desires that his/her washing time is different from those of residents of neighboring properties, the analysis section 225b compares the applicant's power use pattern of a washing machine and those of the residents of the neighboring properties with each other to calculate a property recommendation value in the same manner as in the method described with reference to FIGS. 8A to 8C and 9A and 9B.

Although the server apparatus 220 generates information regarding lifestyle patterns of residents of neighboring properties in the first embodiment, the server apparatus 220 may receive the information regarding lifestyle patterns from another apparatus that generates and provides the information, and then use the information for the process for determining the desirability of combinations.

Second Embodiment

In a second embodiment, a case will be described in which there are a plurality of applicants for a single candidate property in an apartment house and the desirability of a combination of each applicant and the candidate property is determined.

Figure 16:
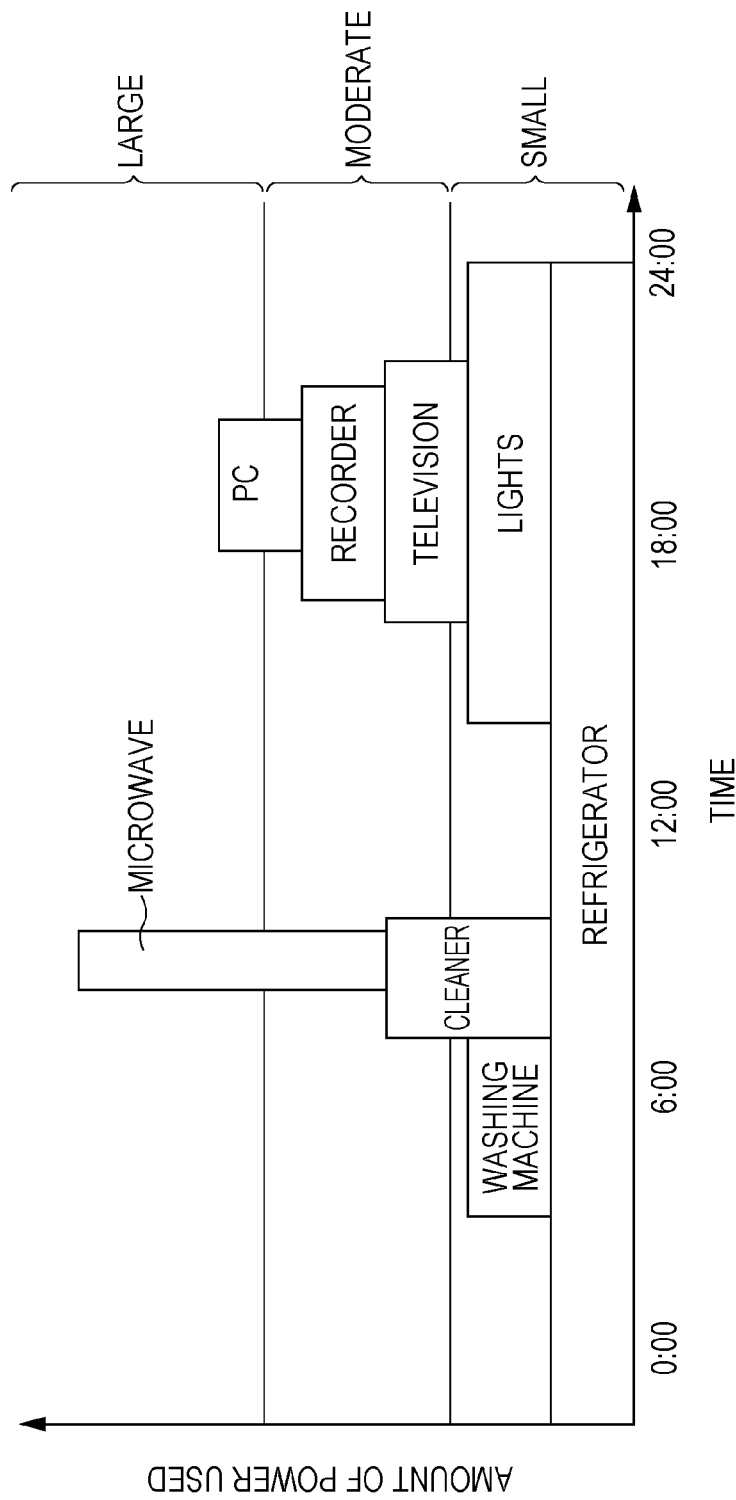
FIG. 16 is a diagram illustrating an example of a power rate plan in an apartment house.

First, a power rate plan adopted by the apartment house including the candidate property will be described. FIG. 16 is a diagram illustrating an example of the power rate plan adopted by the apartment house. In the power rate plan illustrated in FIG. 16, three different rates, namely high, moderate, and low rates, are set in accordance with the amount of power used in unit time.

In FIG. 16, for example, the total amount of power used is small in a time period in which only a refrigerator is used and a time period in which only the refrigerator and a washing machine are used. The power rate in these time periods is low. On the other hand, the total amount of power used is high in a time period in which the refrigerator, a cleaner, and a microwave are used and a time period in which the refrigerator, lights, a television set, a recorder, and a PC are used. The power rate in these time periods is high.

It is therefore desirable that a manager of the apartment house be able to select an appropriate applicant on the basis of an evaluation criterion using patterns of the amount of power used by other residents of the apartment house. In the present embodiment, a case will be described in which the desirability of a combination of each applicant and a candidate property is determined from this point of view.

The configuration of a combination desirability determination system according to the present embodiment is the same as that illustrated in FIG. 2, and accordingly description thereof is omitted. The present embodiment, however, is different from the first embodiment in terms of the process performed by the information obtaining section 225a, the analysis section 225b, and the determination section 225c of the server apparatus 220.

In addition, in the first embodiment, information indicating activity patterns of an applicant and information indicating activity patterns of residents of neighboring properties are information indicating lifestyle patterns of the applicant and information indicating lifestyle patterns of the residents of the neighboring properties, respectively. In the second embodiment, information indicating activity patterns of an applicant and information indicating activity patterns of residents of neighboring properties are information indicating a power use pattern of the applicant and information indicating power use patterns of the residents of the neighboring properties.

More specifically, the information obtaining section 225a obtains information regarding the amount of power used in properties neighboring a candidate property from the information providing apparatuses 200a to 200c. The analysis section 225b calculates a sum of the amount of power used in the neighboring properties obtained by the information obtaining section 225a in order to estimate a total power use pattern of the apartment house.

The determination section 225c determines the desirability of a combination of each applicant and a candidate property on the basis of the information indicating a power use pattern of each applicant and information regarding the total power use pattern of the apartment house. This determination method will be described in detail with reference to FIG. 17.

The communication unit 213 may receive the information indicating the power use patterns of each applicant input by each applicant to the input unit 211 of the terminal apparatus 210. Alternatively, the communication unit 213 may receive information estimated by the server apparatus 220 using the resident information 224a or the history information 224b regarding each applicant stored in the server apparatus 220.

Figure 17:
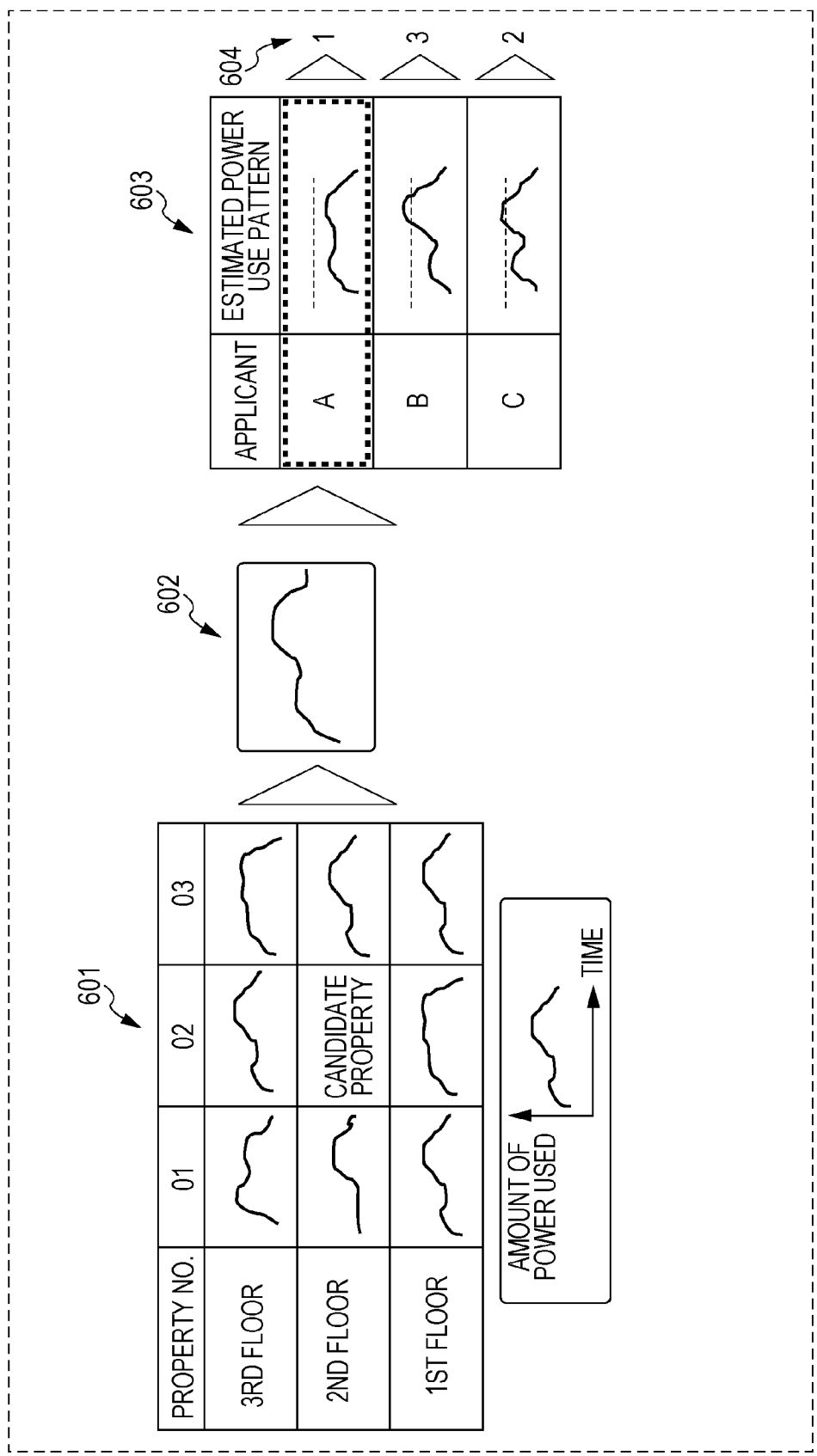
FIG. 17 is a schematic diagram illustrating an example of a process for determining the desirability of combinations of applicants and a candidate property.

Next, a process for determining the desirability of combinations of applicants and a candidate property will be described. FIG. 17 is a schematic diagram illustrating an example of the process for determining the desirability of combinations of applicants and a candidate property.

In FIG. 17, power use patterns 601 correspond to graphs indicating temporal changes in the amount of power used in properties neighboring the candidate property. A total power use pattern 602 is a sum of the power use patterns 601 of the neighboring properties.

Estimated power use patterns 603 are estimated power use patterns after applicants A, B, and C move to the candidate property. That is, the estimated power use patterns 603 are obtained by adding power use patterns of the applicants A, B, and C, respectively, to the total power use pattern 602.

In the process for determining the desirability of combinations, for example, information regarding the estimated power use patterns 603 is converted into information regarding power rates using information regarding a power rate plan. If, for example, a power rate obtained by converting one of the estimated power use patterns 603 is lower than a certain value, it is determined that a combination of the corresponding applicant and the candidate property is desirable. If the power rate is higher than the certain value, it is determined that the combination of the corresponding applicant and the candidate property is undesirable.

In the process for determining the desirability of combinations, for example, the applicants are ranked in order of ascending power rate, which is obtained by converting each of the estimated power use patterns 603. For example, FIG. 17 illustrates a case in which the applicants A, B, and C, each of whom has been determined to be desirable as a new resident of the candidate property, are ranked 604 in order of ascending power rate, that is, the power rate is lowest with the applicant A and highest with the applicant B.

Figure 18:
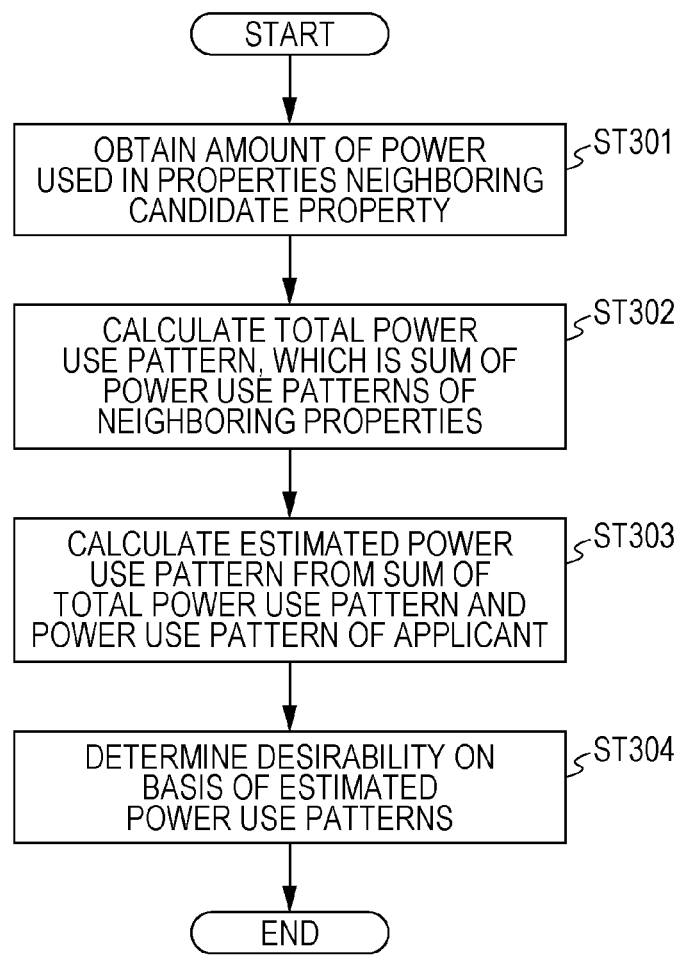
FIG. 18 is a flowchart illustrating an example of a procedure of the process for determining the desirability of combinations performed by the server apparatus.

Next, an example of a procedure of the process for determining the desirability of combinations performed by the server apparatus 220 will be described. FIG. 18 is a flowchart illustrating an example of the procedure of the process for determining the desirability of combinations performed by the server apparatus 220.

The information obtaining section 225a of the server apparatus 220 obtains information regarding the amount of power used in properties neighboring a candidate property from the information providing apparatuses 200a to 200c (ST301). The analysis section 225b calculates a sum of the amount of power used in the neighboring properties obtained by the information obtaining section 225a. The analysis section 225b then calculates power use patterns of the neighboring properties and a total power use pattern, which is a sum of the power use patterns of the neighboring properties (ST302).

The sum of the amount of power used in the neighboring properties may be one in a certain period of time.

The power use patterns of the neighboring properties and the total power use pattern, which is the sum of the power use patterns of the neighboring properties, may be ones in a certain period of time. The certain period of time may be a predetermined period of time such as 1 day, 1 month, or 1 year.

The determination section 225c then calculates estimated power use patterns, which have been described with reference to FIG. 17, on the basis of the information regarding the total power use pattern and the information regarding power use patterns of applicants (ST303). The determination section 225c then determines the desirability of combinations of the applicants and the candidate property using the method described with reference to FIG. 17 (ST304).

Figure 19:
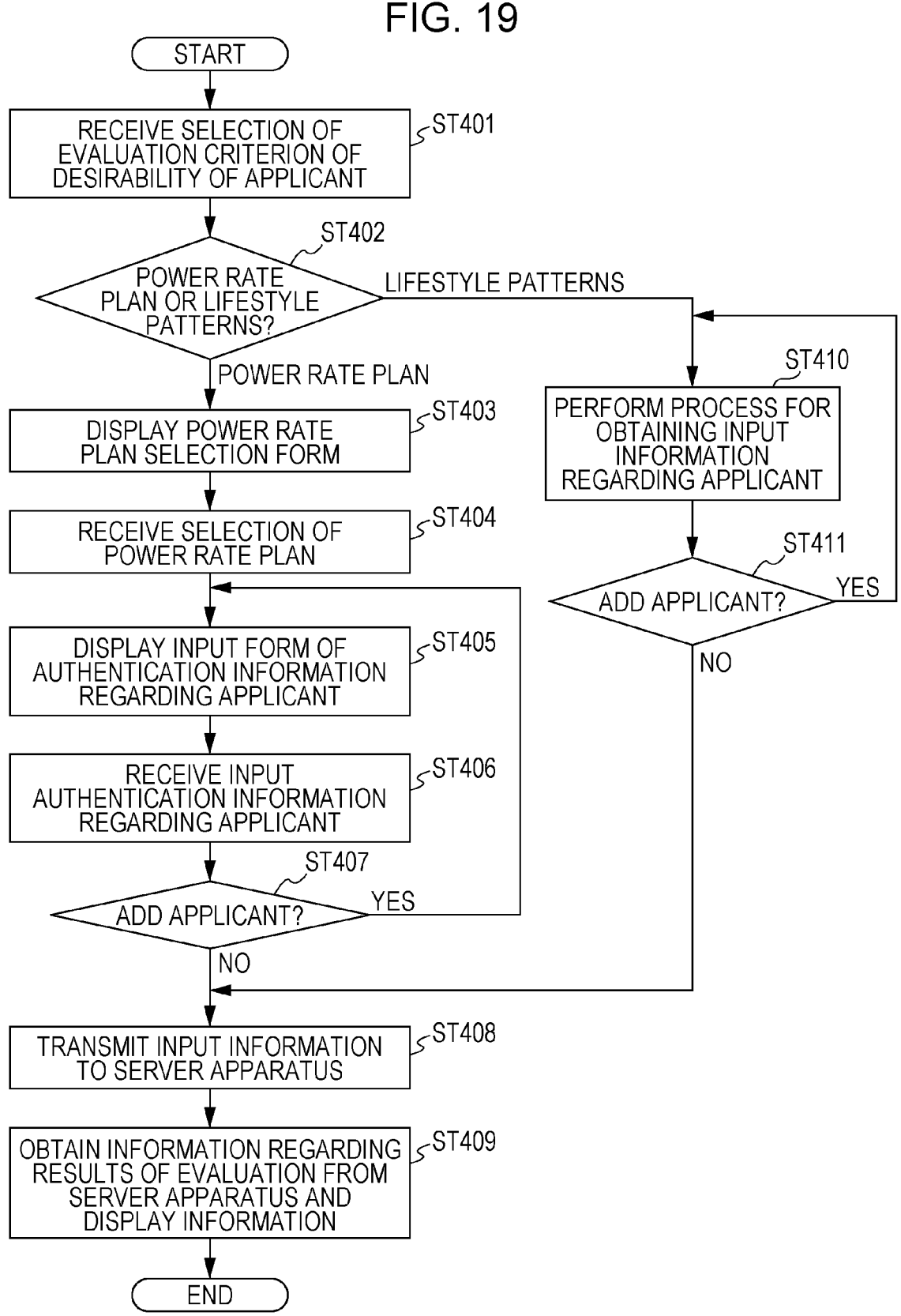
FIG. 19 is a flowchart illustrating an example of a procedure of a process for inputting and outputting applicant search information performed by the terminal apparatus.

Next, a procedure of a process for inputting and outputting applicant search information performed by the terminal apparatus 210 will be described. FIG. 19 is a flowchart illustrating an example of the procedure of the process for inputting and outputting applicant search information performed by the terminal apparatus 210.

FIGS. 20A to 20D are diagrams illustrating an example of UIs displayed on the terminal apparatus 210.

First, the input unit 211 of the terminal apparatus 210 receives selection of an evaluation criterion of the desirability of applicants from a manager of a candidate property (ST401).

Figure 20A:
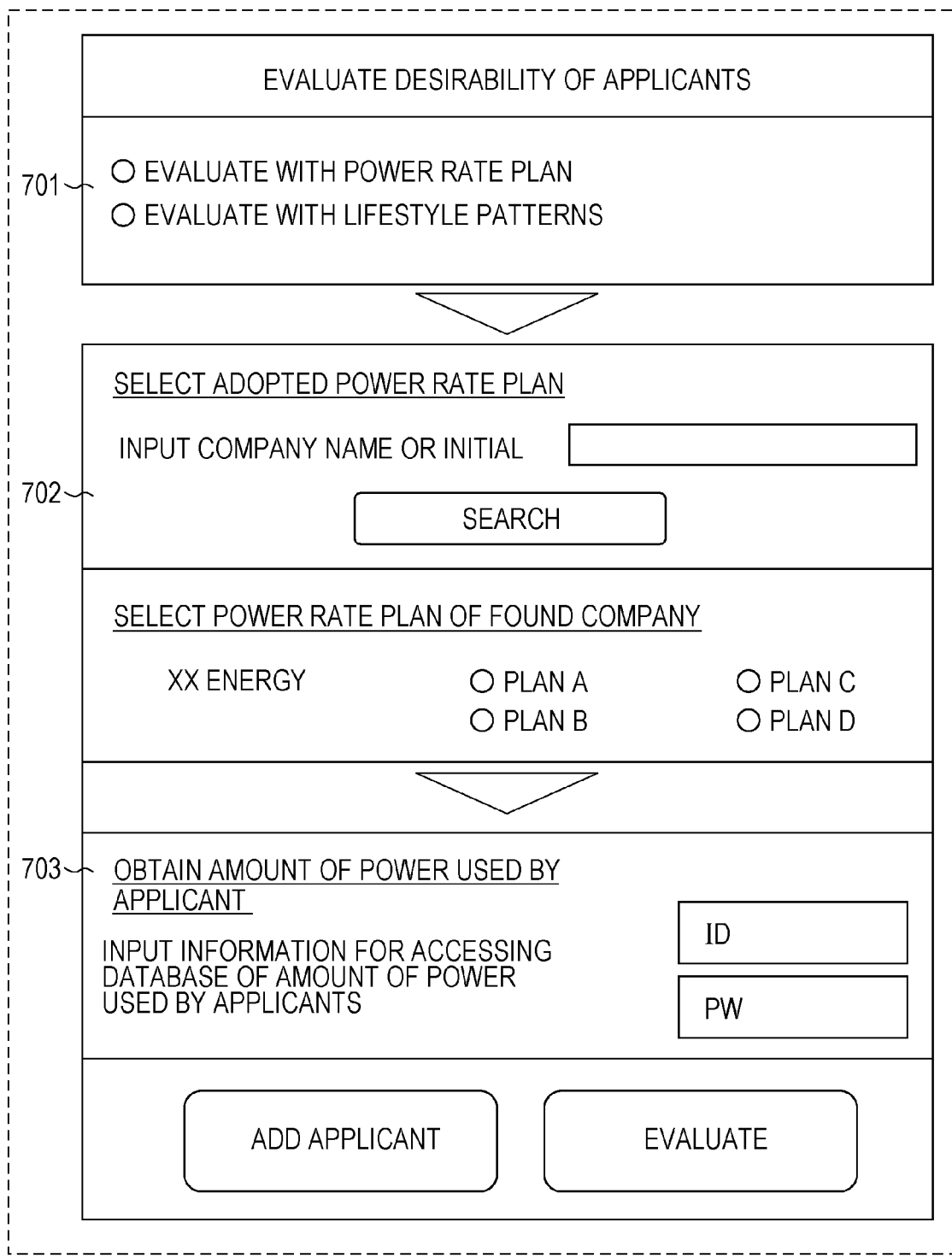
FIG. 20A is a diagram illustrating an example of a user interface displayed on the terminal apparatus.

More specifically, the control unit 215 controls the display unit 212 to cause the display unit 212 to display an evaluation criterion selection screen 701 illustrated in FIG. 20A. The input unit 211 then receives, from the manager, selection of either evaluation of desirability based on a power rate plan ("evaluate with power rate plan" indicated in FIG. 20A) or evaluation of desirability based on lifestyle patterns ("evaluate with lifestyle patterns" indicated in FIG. 20A).

The evaluation based on lifestyle patterns is, as described in the first embodiment, evaluation of the desirability of a combination of an applicant and a candidate property on the basis of similarities and differences between lifestyle patterns of the applicant and lifestyle patterns of residents of neighboring properties.

The control unit 215 then determines whether an evaluation criterion received by the input unit 211 is a power rate plan or lifestyle patterns (ST402). More specifically, the control unit 215 determines whether the manager checks an "evaluate with power rate plan" box or a "evaluate with lifestyle patterns" box in the reading target test list button 701 by operating the input unit 211.

If a power rate plan is selected as the evaluation criterion, the control unit 215 controls the display unit 212 to cause the display unit 212 to display a power rate plan selection form 702 (ST403). The input unit 211 then receives selection of a power rate plan in the power rate plan selection form 702 from the manager (ST404).

The control unit 215 then controls the display unit 212 to cause the display unit 212 to display an applicant authentication information input form 703 (ST405). The input unit 211 receives authentication information regarding an applicant from the manager (ST406).

The authentication information is used for accessing power use pattern information regarding an applicant stored in the server apparatus 220 or the like. The manager inputs the authentication information by, for example, obtaining the authentication information from the applicant in advance.

The control unit 215 then determines whether the input unit 211 receives, from the manager, an instruction to add an applicant (ST407). More specifically, if an "add applicant" button is selected in the applicant authentication information input form 703 illustrated in FIG. 20A, the control unit 215 determines that an applicant is added. If an "evaluation" button is selected, the control unit 215 determines that no applicant is added and evaluation of a current applicant is performed.

If the input unit 211 receives, from the manager, an instruction to add an applicant, the processing in ST405 and ST406 is performed again.

On the other hand, if lifestyle patterns are selected as the evaluation criterion in ST402, the input unit 211 receives information necessary to evaluate the desirability of a combination of an applicant and a candidate property on the basis of similarities and differences between lifestyle patterns of the applicant and lifestyle patterns of residents of neighboring properties (ST410). More specifically, the same processing as that in ST201 to ST219 illustrated in FIGS. 14A and 14B is performed.

The control unit 215 then determines whether the input unit 211 receives, from the manager, an instruction to add an applicant (ST411). If the input unit 211 receives, from the manager, an instruction to add an applicant, the processing in ST410 is performed again.

If it is determined in the determination processing in ST407 or ST 411 that no applicant is added, the control unit 215 controls the communication unit 213 in such a way as to transmit various pieces of information received by the input unit 211 from the manager in the above-described processing and instruct the server apparatus 220 to perform the process for determining the desirability of a combination (ST408).

If a power rate plan is selected in step ST402 as the evaluation criterion, an instruction to perform the process for determining the desirability of a combination based on a power use pattern, which has been described with reference to FIG. 17, is issued. On the other hand, if lifestyle patterns are selected as the evaluation criterion, an instruction to perform the process for determining the desirability of a combination based on a property recommendation value, which has been described with reference to FIGS. 8A to 8C and 9A and 9B, is issued.

Upon receiving the information from the terminal apparatus 210, the server apparatus 220 performs the process for determining the desirability of a combination based on a power use pattern or a property recommendation value and transmits evaluation information regarding an applicant suitable for the candidate property to the terminal apparatus 210.

The communication unit 213 of the terminal apparatus 210 receives the evaluation information regarding an applicant transmitted from the server apparatus 220 as a result of the determination of the desirability of a combination. The display unit 212 displays the received result of the determination of the desirability of a combination (ST409).

Figure 20B:
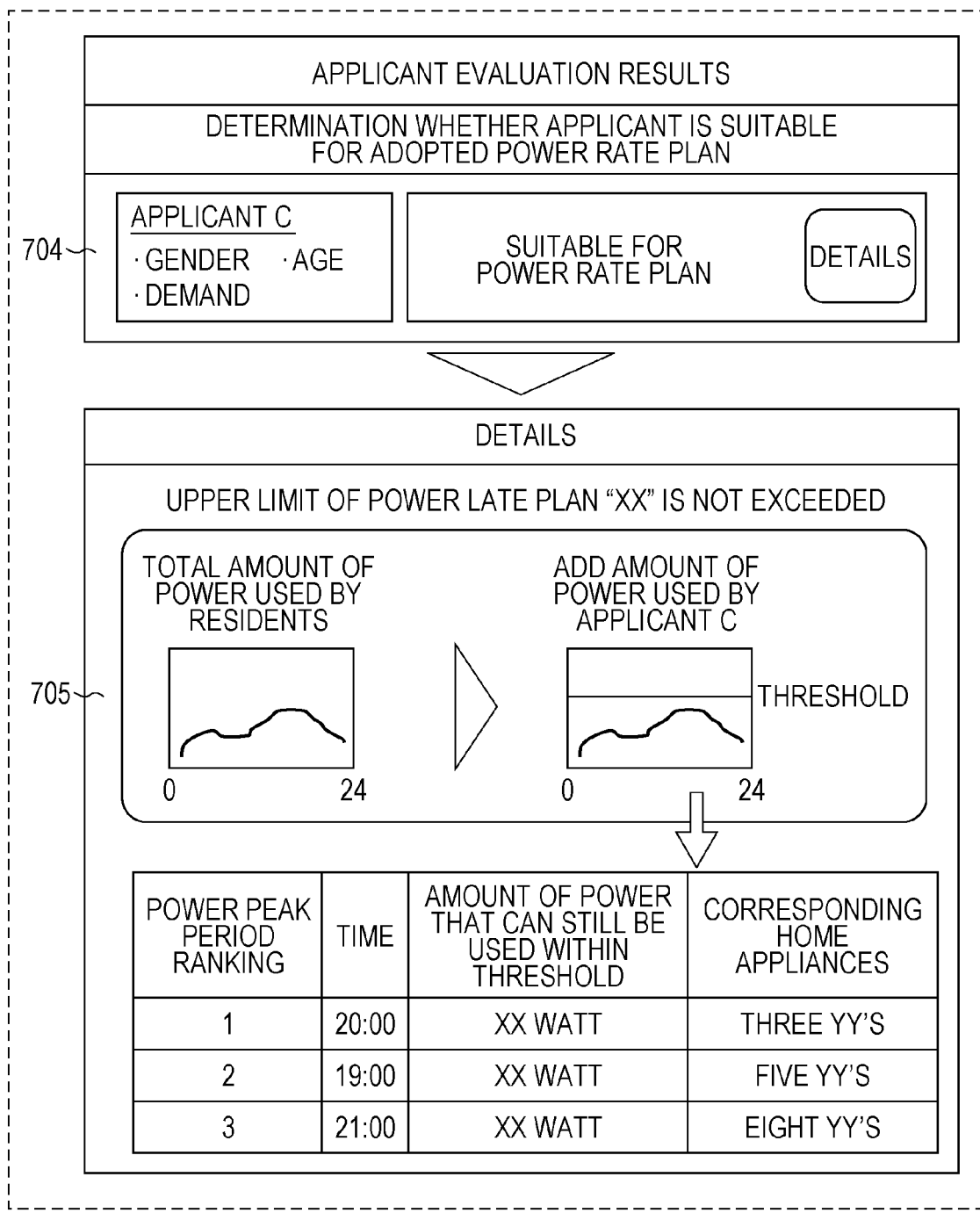
FIG. 20B is a diagram illustrating an example of a user interface displayed on the terminal apparatus.

FIG. 20B illustrates an example of a displayed result of evaluation of a combination of the applicant C and the candidate property. An evaluation result overview 704 includes a result indicating whether the applicant C is suitable for the power rate plan selected in ST404. For example, if the corresponding estimated power use pattern 603 illustrated in FIG. 17 is smaller than a certain threshold, it is determined that the applicant C is suitable for the power rate plan.

If a "details" button included in the evaluation result overview 704 is selected, the display unit 212 of the terminal apparatus 210 displays evaluation result details 705.

The evaluation result details 705 include the total power use pattern 602 and the corresponding estimated power use pattern 603 illustrated in FIG. 17. The analysis section 225b of the server apparatus 220 may calculate rankings of time periods in which the total amount of power used is largest, the time periods, the amount of power that can still be used within the threshold, and the number of home appliances corresponding to the available amount of power, and the like. The display unit 212 of the terminal apparatus 210 may display these pieces of information.

Figure 20C:
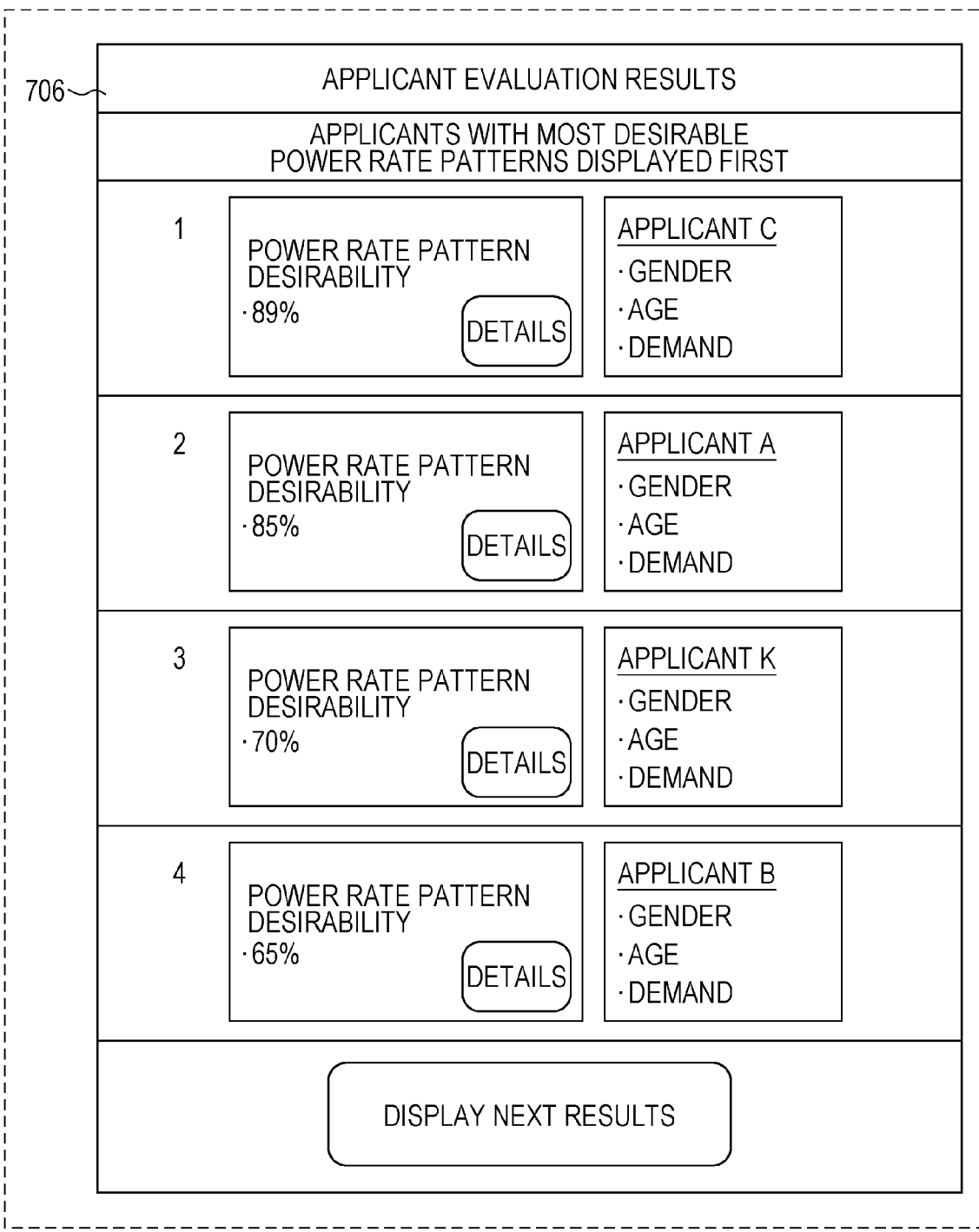
FIG. 20C is a diagram illustrating an example of a user interface displayed on the terminal apparatus.

If a plurality of applicants are added in ST407, results of determinations of the desirability of combinations of the plurality of applicants and the candidate property are ranked in order of desirability as indicated in a display screen 706 illustrated in FIG. 20C. In FIG. 20C, four applicants are ranked in order of desirability, which is based on power rate patterns.

The desirability based on power rate patterns is values calculated using the following expression on the basis of, for example, a certain power rate and power rates corresponding to the estimated power use patterns 603.

Desirability={(certain power rate)−(power rate corresponding to estimated power use pattern 603)}/(certain power rate)

FIG. 20D illustrates an example of a display screen 707 for results of determinations of the desirability of combinations at a time when "evaluate with lifestyle patterns" has been selected in ST402. In the display screen 707, as in the display screen 506 illustrated in FIG. 15C, information indicating how closely the lifestyle patterns of each applicant match those of the residents of the properties neighboring the candidate property is displayed. The applicants are ranked in order of the degree of matching.

Profiles of the applicants may also be displayed. The storage unit 224 of the server apparatus 220 may store the profiles in advance, and after receiving the profiles from the server apparatus 220, the display unit 212 of the terminal apparatus 210 may display the profiles.

Although the desirability of a combination of an applicant and a candidate property is determined on the basis of a power rate in the above description, the desirability of a combination of an applicant and a candidate property may be determined on the basis of the amount of power used, instead.

In the process for determining the desirability of combinations, for example, if a sum of the amount of power used by an applicant in a certain period of time and the amount of power used by residents of properties neighboring a candidate property is smaller than a certain value, it is determined that a combination of the applicant and the candidate property is desirable. If the sum is larger than the certain value, it is determined that the combination of the applicant and the candidate property is undesirable. The storage unit 224 of the server apparatus 220 may store information regarding the certain period of time in advance.

Alternatively, the storage unit 224 of the server apparatus 220 may store the information regarding the certain period of time specified by the manager.

In the process for determining the desirability of combinations, an applicant with whom a sum of the amount of power used by the applicant in the certain period of time and the amount of power used by residents of properties neighboring a candidate property in the certain period of time is the smallest may be ranked first. As in the case illustrated in FIG. 20C, results of determinations of the desirability of combinations of the plurality of applicants and the candidate property may be displayed in accordance with rankings. This process is effective when the power rate becomes high if the sum of the amount of power used exceeds a certain value.

Alternatively, the desirability of combinations of applicants and a candidate property may be determined on the basis of peaks of the estimated power use patterns 603 in a certain period of time.

In the process for determining the desirability of combinations, if a peak of an estimated power use pattern 603, which is a sum of the amount of power used by an applicant in a certain period of time and the amount of power used by residents of properties neighboring a candidate property, is smaller than a certain value, it is determined that a combination of the applicant and the candidate property is desirable. If the peak is larger than the certain value, it is determined that the combination of the applicant and the candidate property is undesirable.

Furthermore, in the process for determining the desirability of combinations, applicants may be ranked in order of descending peak of the estimated power use pattern 603 in a certain period of time. As in the case illustrated in FIG. 20C, results of determinations of combinations of the plurality of applicants and the candidate property may be displayed in accordance with rankings. This process is effective when the power rate becomes high if a peak of the estimated power use pattern 603 in the certain period of time exceeds a certain value.

Furthermore, in the process for determining the desirability of combinations, applicants may be ranked in order of ascending variation (deviation) in the estimated power use pattern 603 in a certain period of time.

As in the case illustrated in FIG. 20C, results of determinations of combinations of the plurality of applicants and the candidate property may be displayed in accordance with rankings.

This process is effective, for example, when the power rate becomes high if the amount of variation in the estimated power use pattern 603 in the certain period of time exceeds a certain value.

Although information regarding power use patterns is used in the process for determining the desirability of combinations in the second embodiment, information regarding gas use patterns or water use patterns may be used, instead. In this case, the desirability of combinations of applicants and a candidate property may be determined such that a gas rate or a water rate does not become high.

Although the first and second embodiments have been described with reference to the drawings, the above-described functions of the apparatuses such as the information providing apparatuses 200a to 200c, the terminal apparatus 210, and the server apparatus 220 can be realized by a computer program.

Figure 21:
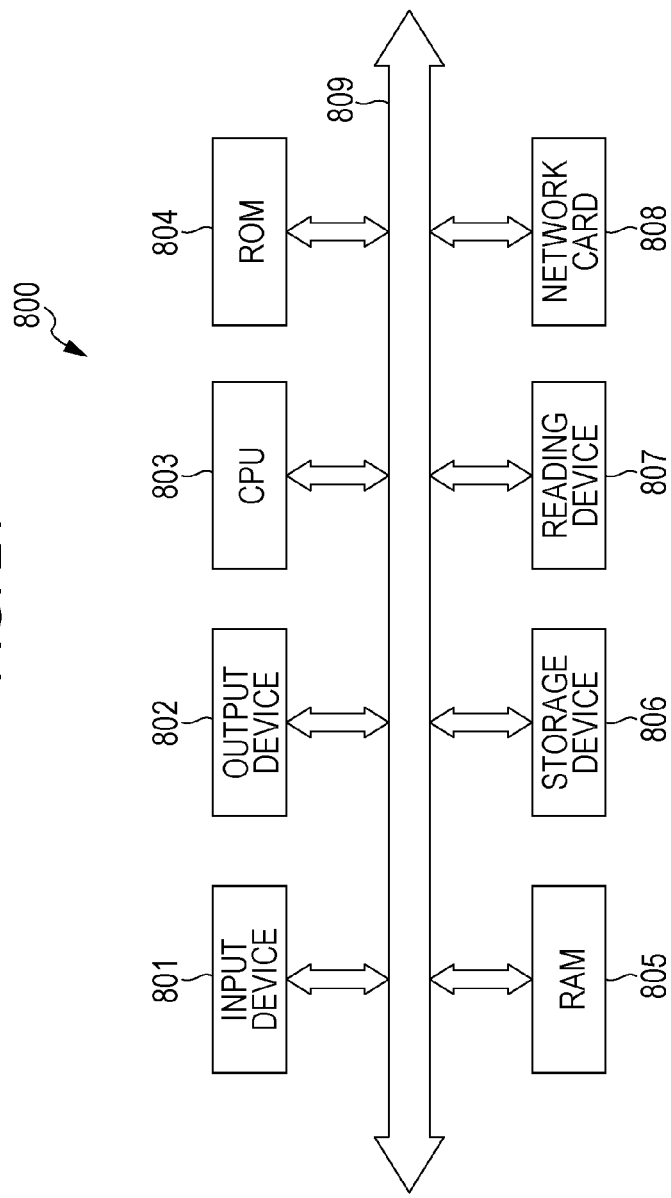
FIG. 21 is a diagram illustrating the hardware configuration of a computer that realizes functions of apparatuses using a program.

FIG. 21 is a flowchart illustrating the hardware configuration of a computer 800 that realizes the functions of the apparatuses using a program.

For example, the computer 800 includes an input device 801 such as a keyboard, a mouse, or a touch pad, an output device 802 such as a display or a speaker, a central processing unit (CPU) 803, read-only memory (ROM) 804, a random-access memory (RAM) 805, a storage device 806 such as a hard disk device or a solid-state drive (SSD), a reading device 807 that reads information from a recording medium such as a digital versatile disk read-only memory (DVD-ROM) or a Universal Serial Bus (USB) memory, and a network card 808 that communicates with other devices through a network. These components are connected to one another through a bus 809.

The reading device 807 reads a program for realizing the functions of the apparatuses from a recording medium and stores the obtained program in the storage device 806. Alternatively, the network card 808 communicates with a server apparatus connected to the network and downloads the program for realizing the functions of the apparatuses. The network card 808 then stores the program in the storage device 806.

The CPU 803 then copies the program stored in the storage device 806 to the RAM 805. The CPU 803 sequentially reads, from the RAM 805, commands included in the program and executes the commands to realize the functions of the apparatuses.

The techniques described in the above embodiments can be realized, for example, by the following types of cloud service. Types of cloud service that can realize the techniques described in the above embodiments, however, are not limited to these.

First Service Type: In-House Data Center Type

Figure 22:
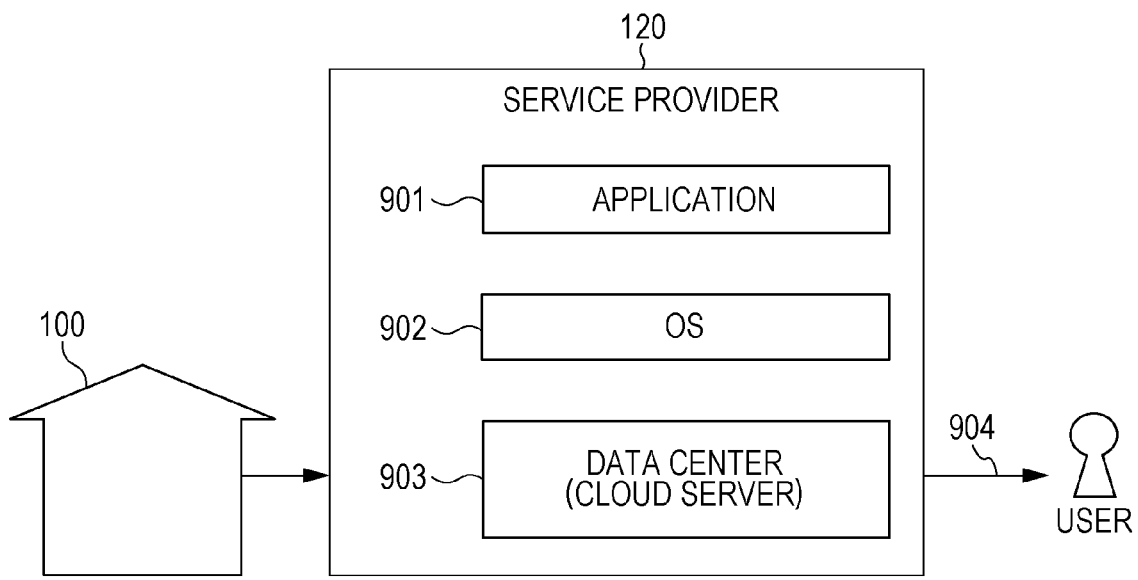
FIG. 22 is a diagram illustrating a first service type (in-house data center type)

FIG. 22 is a diagram illustrating a first service type (in-house data center type). In this type, the service provider 120 obtains information from the group 100 and provides a service for a user. In this type, the service provider 120 has a function of the data center management company 110. That is, the service provider 120 owns the cloud server 111 that manages big data. Therefore, there is no data center management company.

In this type, the service provider 120 manages and operates a data center 903 (cloud server 111). The service provider 120 also manages an operating system (OS) 902 and an application 901. The service provider 120 provides a service 904 using the OS 902 and the application 901 managed thereby.

Second Service Type: IaaS Use Type

Figure 23:
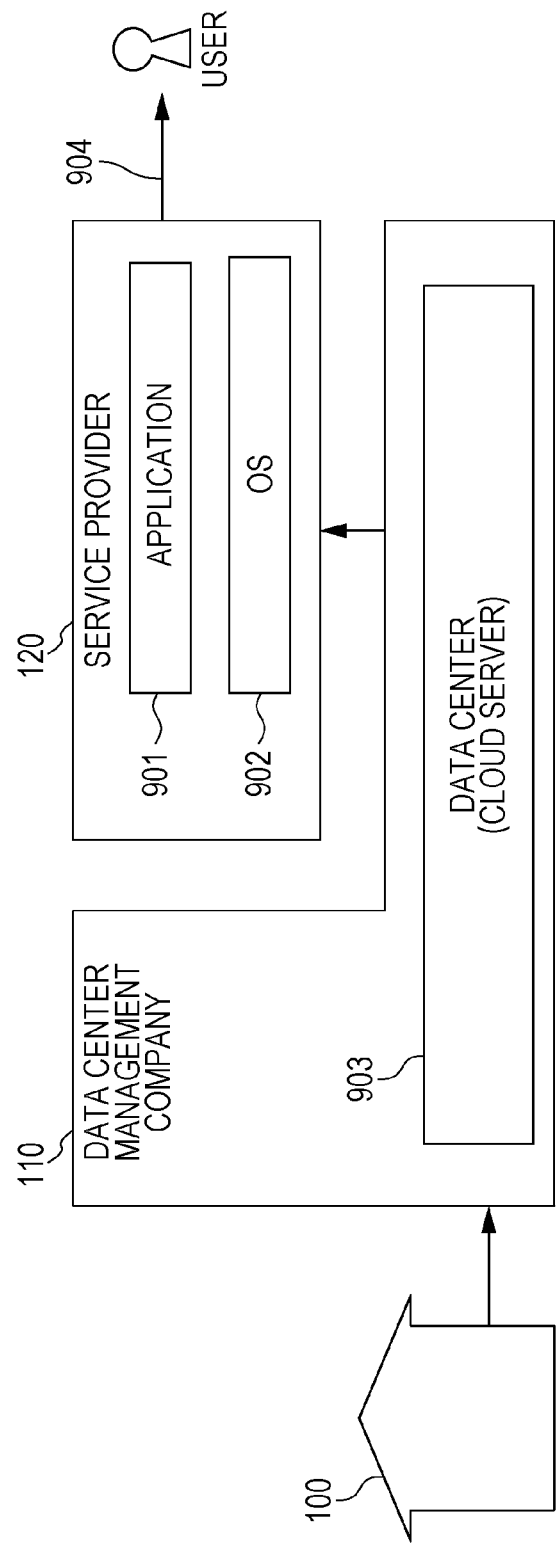
FIG. 23 is a diagram illustrating a second service type (IaaS use type)

FIG. 23 is a diagram illustrating a second service type (IaaS use type). IaaS is an abbreviation for Infrastructure as a Service, which is a cloud service provision model that provides an infrastructure for constructing and operating a computer system as a service provided through the Internet.

In this type, the data center management company 110 manages and operates the data center 903 (cloud server 111). The service provider 120 also manages the OS 902 and the application 901. The service provider 120 provides a service 904 using the OS 902 and the application 901 managed thereby.

Third Service Type: PaaS Use Type

Figure 24:
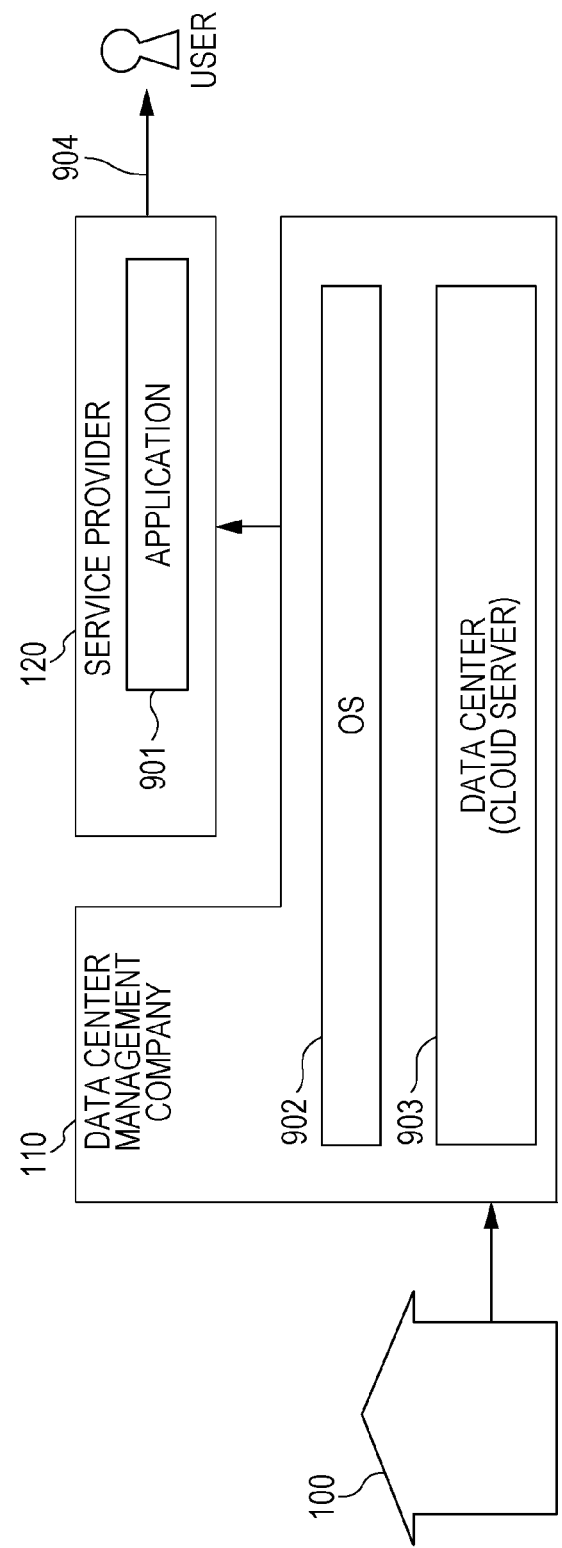
FIG. 24 is a diagram illustrating a third service type (PaaS use type)

FIG. 24 is diagram illustrating a third service type (PaaS use type). PaaS is an abbreviation for Platform as a Service, which is a cloud service provision model that provides a platform for constructing and operating software as a service provided through the Internet.

In this type, the data center management company 110 manages the OS 902 and operates and manages the data center 903 (cloud server 111). The service provider 120 manages the application 901. The service provider 120 provides a service 904 using the OS 902 managed by the data center management company 110 and the application 901 managed thereby.

Fourth Service Type: SaaS Use Type

Figure 25:
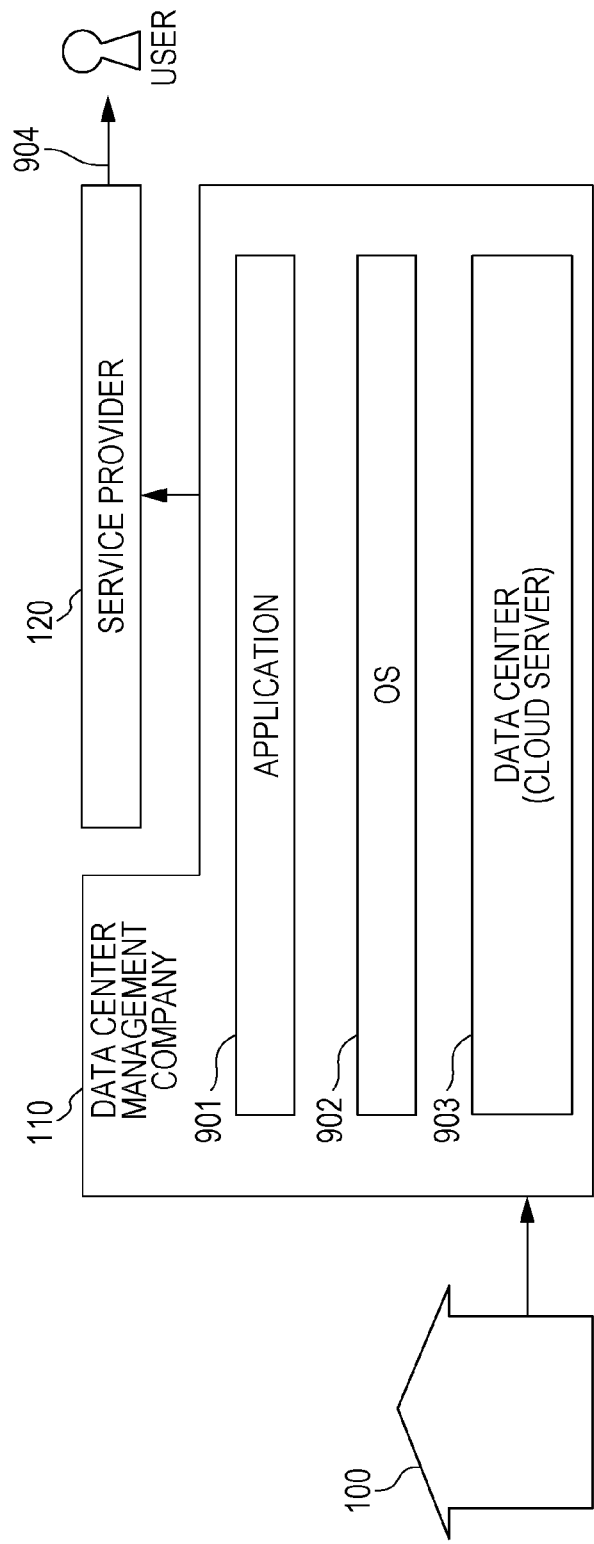
FIG. 25 is a diagram illustrating a fourth service type (SaaS use type).

FIG. 25 is a diagram illustrating a fourth service type (SaaS use type). SaaS is an abbreviation for Software as a Service, which is, for example, a cloud service provision model having a function of enabling a company or an individual (user) who does not own the data center 903 (cloud server 111) to use an application provided by a platform provider who owns the data center 903 (cloud server 111) through a network such as the Internet.

In this type, the data center management company 110 manages the application 901 and the OS 902 and operates and manages the data center 903 (cloud server 111). The service provider 120 provides a service 904 using the OS 902 and the application 901 managed by the data center management company 110.

It is assumed in any of the above-described types that the service provider 120 provides a service. For example, the service provider 120 or the data center management company 110 may develop the OS 902, the application 901, or the database of big data or may outsource to the development work.

In the second embodiment, if there are a plurality of applicants for a single candidate property, the desirability of combinations of the plurality of applicants and the candidate property is determined on the basis of patterns of the amount of power used by the plurality of applicants and patterns of the amount of power used by residents of properties neighboring the candidate property.

As a result, it is possible to select an applicant suitable for the candidate property from among the plurality of applicants in consideration of a power use pattern of an apartment house including the candidate property.

Although specific lifestyle patterns such as sleep and washing are estimated in the first embodiment, simplified lifestyle patterns, such as active and inactive, may be estimated.

Although information regarding activity patterns in a day is used in the first and second embodiments, information regarding activity patterns in a longer period of time, such as a week, may be used, instead.

Although information regarding activity patterns is estimated on the basis of information regarding power use patterns in a day obtained from the information providing apparatuses 200*a* to 200*c* in the first and second embodiments, information regarding activity patterns may be estimated on the basis of power use patterns obtained by averaging power use patterns from a plurality of days, instead.

Supplementary Explanations

A combination desirability determination apparatus, a method for determining the desirability of a combination, and a non-temporary recording medium storing a program in the present disclosure will be described hereinafter.

(a) A combination desirability determination apparatus in the present disclosure is a combination desirability determination apparatus including:

a storage that stores information indicating activity patterns of an applicant and information indicating activity patterns of residents of properties neighboring a candidate property, which is a candidate for a property to which the applicant moves; and a determiner that determines desirability of a combination of the applicant and the candidate property on the basis of the information indicating the activity patterns of the applicant and the information indicating the activity patterns of the residents of the neighboring properties.

(b) In addition, the combination desirability determination apparatus may further include:

an obtainer that obtains the information indicating the activity patterns of the residents of the neighboring properties from another apparatus.

(c) In addition, in the combination desirability determination apparatus, the information indicating the activity patterns of the applicant and the information indicating the activity patterns of the residents of the neighboring properties may be use pattern information indicating use patterns of at least any of power, gas, and water of the applicant and the residents of the neighboring properties, respectively.

(d) In addition, in the combination desirability determination apparatus, the use patterns may indicate temporal changes in amount of at least any of power, gas, and water used by the applicant and the residents of the neighboring properties, and the determiner may calculate an estimated use pattern by adding the use pattern of the applicant and the use patterns of the residents of the neighboring properties, and, if a peak of the estimated use pattern in a certain period of time is smaller than a certain value, determine that the combination of the applicant and the candidate property is desirable and, if the peak is larger than the certain value, determine that the combination of the applicant and the candidate property is undesirable.

(e) In addition, in the combination desirability determination apparatus, the use patterns may be indicate temporal changes in amount of at least any of power, gas, and water used by the applicant and the residents of the neighboring properties, and if a sum of the amount used by the applicant in a certain period of time and the amount used by the residents of the neighboring properties in the certain period of time is smaller than a certain value, the determiner may determine that the combination of the applicant and the candidate property is desirable and, if the sum is larger than the certain value, the determiner may determine that the combination of the applicant and the candidate property is undesirable.

(f) In addition, in the combination desirability determination apparatus, the use patterns may indicate temporal changes in amount of at least any of power, gas, and water used by the applicant and the residents of the neighboring properties, and the determiner may calculate an estimated use pattern by adding the use pattern of the applicant and the use patterns of the residents of the neighboring properties, and, if a rate corresponding to the estimated use pattern is lower than a certain value, determine that the combination of the applicant and the candidate property is desirable and, if the rate is higher than the certain value, determine that the combination of the applicant and the candidate property is undesirable.

(g) In addition, in the combination desirability determination apparatus,
the use patterns may indicate temporal changes in amount of at least any of power, gas, and water used by the applicant and the residents of the neighboring properties, and
the determiner may calculate an estimated use pattern by adding the use pattern of the applicant and the use patterns of the residents of the neighboring properties, and, if variation of the calculated estimated use pattern in a certain period of time is smaller than a certain value, determine that the combination of the applicant and the candidate property is desirable and, if the variation in the certain period of time is larger than the certain value, determine that the combination of the applicant and the candidate property is undesirable.

(h) In addition, the combination desirability determination apparatus may further include
an analyzer that generates the information indicating the activity patterns on the basis of information regarding amount of at least any of power, gas, and water used by the applicant and the residents of the neighboring properties.

(i) In addition, in the combination desirability determination apparatus,
the information indicating the activity patterns may include information regarding a time of at least any of sleep, rising, going out, meal, cooking, relaxing, returning home, and housework.

(j) In addition, in the combination desirability determination apparatus,
the determiner may determine a degree of matching between the activity patterns of the applicant and the activity patterns of the residents of the neighboring properties and, if the degree of matching between the activity patterns of the applicant and the activity patterns of the residents of the neighboring properties is higher than a certain level, determine that the combination of the applicant and the candidate property is desirable and, if the degree of matching between the activity patterns of the applicant and the activity patterns of the residents of the neighboring properties is lower than the certain level, determine that the combination of the applicant and the candidate property is undesirable.

(k) In addition, in the combination desirability determination apparatus,
the determiner may determine a degree of matching between the activity patterns of the applicant and the activity patterns of the residents of the neighboring properties and, if the degree of matching between the activity patterns of the applicant and the activity patterns of the residents of the neighboring properties is higher than a certain level, determine that the combination of the applicant and the candidate property is undesirable and, if the degree of matching between the activity patterns of the applicant and the activity patterns of the residents of the neighboring properties is lower than the certain level, determine that the combination of the applicant and the candidate property is desirable.

(l) In addition, in the combination desirability determination apparatus,
the determiner may generate the information indicating the activity patterns of the applicant on the basis of information regarding activity patterns of the applicant before and after the applicant moved to a new property in past.

(m) In addition, in the combination desirability determination apparatus,
the storage may include a memory, and
the determiner may include a processor.

(n) A method for determining desirability of a combination in the present disclosure is a method for determining desirability of a combination of an applicant and a candidate property. The method includes:
storing, in a storage, information indicating activity patterns of the applicant and information indicating activity patterns of residents of properties neighboring the candidate property, which is a candidate for a property to which the applicant moves; and
determining the desirability of the combination of the applicant and the candidate property on the basis of the information indicating the activity patterns of the applicant and the information indicating the activity patterns of the residents of the neighboring properties stored in the storage.

(o) In addition, the method may further include:
displaying a degree of matching between the applicant and the candidate property in rankings on the basis of a result of the determination made in the determining.

(p) In addition, in the method,
the storage may include a memory, and
a processor may perform at least either the storing or the determining.

(q) A computer-readable recording medium in the present disclosure is a non-temporary recording medium storing a program. The program causes a computer to perform a process including:
storing, in a storage, information indicating activity patterns of an applicant and information indicating activity patterns of residents of properties neighboring a candidate property, which is a candidate for a property to which the applicant moves; and
determining desirability of a combination of the applicant and the candidate property on the basis of the information indicating the activity patterns of the applicant and the information indicating the activity patterns of the residents of the neighboring properties stored in the storage.

The combination desirability determination apparatus, the method for determining the desirability of a combination, and the non-temporary recording medium storing a program in the present disclosure are effective in a system that determines the desirability of a combination of an applicant and a property.

What is claimed is:

1. A combination desirability determination apparatus comprising:
a storage that stores information indicating activity pattern of an applicant and information indicating activity patterns of residents of properties neighboring a candidate property, which is a candidate for a property to which the applicant moves, wherein the information indicating the activity pattern of the applicant includes use-pattern-information indicating a use pattern of at least one of power, gas, or water of the applicant, wherein the use pattern of the applicant is generated based on use amount data indicating a temporal change in an amount of the at least one of power, gas, or water used by the applicant, wherein the use amount data of the applicant is acquired from an information providing apparatus connected to the combination desirability determination apparatus via network, wherein the information indicating the activity patterns of the residents of the neighboring properties includes use-pattern-information indicating use patterns of at least one of power, gas, or water of the residents of the neighboring properties, wherein each of the use patterns of the residents of the neighboring properties is generated based on use amount data indicating a temporal change in an amount of at least one of power, gas, or water used by corresponding one of the residents of the neighboring properties, and wherein use amount data pieces of the residents of the neighboring properties are acquired from the information providing apparatus; and a processor that:

calculates an estimated use pattern by adding the use pattern of the applicant indicated by the stored use-pattern-information of the applicant and the use patterns of the residents of the neighboring properties indicated by the stored use-pattern-information of the residents of the neighboring properties, compares a certain value with (i) a peak of the estimated use pattern in a certain period of time, (ii) a rate corresponding to the estimated use pattern, or (iii) an amount of variation of the estimated use pattern in a certain period of time, determines that a combination of the applicant and the candidate property is desirable, (i) if the peak of the estimated use pattern in the certain period of time is smaller than the certain value, (ii) if the rate corresponding to the estimated use pattern is lower than the certain value, or (iii) if the amount of variation of the estimated use pattern in the certain period of time is smaller than the certain value, and controls a terminal to visually output first output information on a display screen of a display of the terminal, wherein the first output information includes (i) information indicating the applicant and the candidate property and (ii) information indicating that the combination of the applicant and the candidate property is determined to be desirable.

2. The combination desirability determination apparatus according to claim 1, wherein the processor further:

acquires the use amount data of the applicant from the information providing apparatus;

acquires the use amount data pieces of the residents of the neighboring properties from the information providing apparatus;

generates information indicating the use pattern of the applicant based on the acquired use amount data of the applicant;

generates information indicating the use patterns of the residents of the neighboring properties based on the acquired use amount data pieces of the residents of the neighboring properties;

stores, into the storage, the generated information indicating the use pattern of the applicant as the use-pattern-information of the applicant; and stores, into the storage, the generated information indicating the use patterns of the residents of the neighboring properties as the use-pattern-information of the residents of the neighboring properties.

3. The combination desirability determination apparatus according to claim 2, wherein the use-pattern-information of the applicant indicates a use pattern of power used by the applicant, and the use pattern of power used by the applicant is generated based on use amount data indicating a temporal change in amount of power used by the applicant, wherein the use-pattern-information of the residents of the neighboring properties indicates use patterns of power used by the residents of the neighboring properties, and the use patterns of power used by the residents of the neighboring properties are generated based on use amount data pieces indicating temporal changes in amount of power used by the residents of the neighboring properties, wherein the information providing apparatus includes:

a first distribution switchboard which is provided for a property in which the applicant used to live and which is connected to one or more first electrical devices in the property in which the applicant used to live; and second distribution switchboards which is provided for the neighboring properties and each of which is connected to one or more second electrical device in corresponding one of the neighboring properties, wherein the processor acquires, from the first distribution switchboard, power use data indicating a temporal change in an amount of power used by the one or more first electrical device, as the use amount data of the applicant, wherein the processor acquires, from the second distribution switchboards, power use data pieces each indicating a temporal change in an amount used by the one or more second electrical device in corresponding one of the neighboring properties, as the use amount data pieces of the residents of the neighboring properties.

4. The combination desirability determination apparatus according to claim 1, wherein the processor further:

determines that the combination of the applicant and the candidate property is undesirable (i) if the peak is larger than the certain value, (ii) if the rate is higher than the certain value, or (iii) if the amount of variation in the certain period of time is larger than the certain value, and controls the terminal to visually output second output information on the display screen of the display, the second output information including (i) information indicating the applicant and the candidate property and (ii) information indicating that the combination of the applicant and the candidate property is determined to be undesirable.

5. The combination desirability determination apparatus according to claim 4, wherein the processor further receives, from the terminal, a user instruction to determine whether the combination of the applicant and the candidate property is desirable, the user instruction being input via user interface of the terminal, and wherein the processor determines whether the combination of the applicant and the candidate property is desirable upon receiving the user instruction.

6. The combination desirability determination apparatus according to claim 1, wherein the information indicating the activity pattern of the applicant and the information indicating the activity patterns of the residents of the neighboring properties include information regarding a time of at least one of sleep, rising, going out, a meal, cooking, relaxing, returning home, or housework.

7. The combination desirability determination apparatus according to claim 6, wherein the processor further determines a degree of matching between the activity pattern of the applicant and the activity patterns of the residents of the neighboring properties, wherein if the degree of matching between the activity pattern of the applicant and the activity patterns of the residents of the neighboring properties is higher than a certain level, the processor determines that the combination of the applicant and the candidate property is desirable, and wherein if the degree of matching between the activity pattern of the applicant and the activity patterns of the residents of the neighboring properties is lower than the certain level, the processor determines that the combination of the applicant and the candidate property is undesirable.

8. The combination desirability determination apparatus according to claim 6, wherein the processor further determines a degree of matching between the activity pattern of the applicant and the activity patterns of the residents of the neighboring properties, wherein if the degree of matching between the activity pattern of the applicant and the activity patterns of the residents of the neighboring properties is higher than a certain level, the processor determines that the combination of the applicant and the candidate property is undesirable, and wherein if the degree of matching between the activity pattern of the applicant and the activity patterns of the residents of the neighboring properties is lower than the certain level, the processor determines that the combination of the applicant and the candidate property is desirable.

9. The combination desirability determination apparatus according to claim 6, wherein the processor is further configured to generate the information indicating the activity pattern of the applicant on the basis of information regarding activity patterns of the applicant before and after the applicant moved to a new property in past.

10. The combination desirability determination apparatus according to claim 1, wherein the storage includes a memory.

11. The combination desirability determination apparatus according to claim 1, wherein the use-pattern-information of the applicant indicates a use pattern of power used by the applicant, the use pattern of power used by the applicant is generated based on use amount data indicating a temporal change in amount of power used by the applicant, and the use amount data of the applicant is power use data indicating a temporal change in an amount of power used by one or more first electrical device in a property in which the applicant used to live, and wherein the use-pattern-information of the residents of the neighboring properties indicates use patterns of power used by the residents of the neighboring properties, the use patterns of power used by the residents of the neighboring properties are generated based on use amount data pieces indicating temporal changes in amount of power used by the residents of the neighboring properties, and the use amount data pieces are power use data pieces each indicating a temporal change in amount used by one or more second electrical device in corresponding one of the neighboring properties.

12. The combination desirability determination apparatus according to claim 11, wherein the storage further stores information indicating activity pattern of another applicant, a candidate property of the other applicant is the same as the candidate property of the applicant, the information indicating the activity pattern of the other applicant includes use-pattern-information indicating a use pattern of at least one of power, gas, or water of the other applicant, the use pattern of the other applicant is generated based on use amount data indicating a temporal change in an amount of the at least one of power, gas, or water used by the other applicant, and the use amount data of the other applicant is acquired from the information providing apparatus, wherein the processor further:

calculates another estimated use patterns by adding use pattern of the other applicant indicated by the stored use-pattern-information of the other applicant and the use patterns of the residents of the neighboring properties indicated by the stored use-pattern-information of the residents of the neighboring properties, compares the certain value with (i) a peak of the other estimated use pattern in the certain period of time, (ii) a rate corresponding to the other estimated use pattern, or (iii) an amount of variation of the other estimated use patterns in the certain period of time, determines that a combination of the other applicant and the candidate property is desirable, (i) if the peak of the other estimated use pattern in the certain period of time is smaller than the certain value, (ii) if the rate corresponding to the other estimated use pattern is lower than the certain value, or (iii) if the amount of variation of the other estimated use pattern in the certain period of time is smaller than the certain value, determines a second degree indicating value corresponding to a desirability of the combination of the other applicants and the candidate property using the certain value and the other estimated use pattern, and controls the terminal to visually output third output information on a screen of a display of the terminal, wherein the third output information includes (i) information indicating the other applicant and the candidate property, (ii) information indicating that the combination of the other applicant and the candidate property is determined to be desirable, and (iii) information indicating the second degree, and wherein the processor further controls the terminal to control positions of the first information and the third information on the display screen of the display based on the first degree indicated by the first information and the second degree indicated by the third information.

13. The combination desirability determination apparatus according to claim 1, wherein the processor further determines a first degree indicating a value corresponding to a desirability of the combination of the applicants and the candidate property using the certain value and the estimated use pattern, and wherein the first output information further includes information indicating the degree.

14. A method used in a combination desirability determination apparatus, the method causing a processor of the combination desirability determination apparatus to execute a process comprising:

storing, in a storage of the combination desirability determination apparatus, information indicating activity pattern of the applicant and information indicating activity patterns of residents of properties neighboring the candidate property, which is a candidate for a property to which the applicant moves, wherein the information indicating the activity pattern of the applicant includes use-pattern-information indicating a use pattern of at least one of power, gas, or water of the applicant, wherein the use pattern of the applicant is generated based on use amount data indicating a temporal change in an amount of the at least one of power, gas, or water used by the applicant, wherein the use amount data by the applicant is acquired from an information providing apparatus connected to the combination desirability determination apparatus via network, wherein the information indicating the activity patterns of the residents of the neighboring properties includes use-pattern-information indicating use patterns of at least one of power, gas, or water of the residents of the neighboring properties, wherein each of the use patterns of the residents of the neighboring properties is generated based on use amount data indicating a temporal change in an amount of the at least one of power, gas, or water used by corresponding one of the residents of the neighboring properties, and wherein use amount data pieces of the residents of the neighboring properties are acquired from the information providing apparatus; and calculating an estimated use pattern by adding the use pattern of the applicant indicated by the stored use-pattern-information of the applicant and the use patterns of the residents of the neighboring properties indicated by the stored use-pattern-information of the residents of the neighboring properties;

comparing a certain value with (i) a peak of the estimated use pattern in a certain period of time, (ii) a rate corresponding to the estimated use pattern, or (iii) an amount of variation of the estimated use pattern in a certain period of time;

determining that a combination of the applicant and the candidate property is desirable, (i) if the peak of the estimated use pattern in the certain period of time is smaller than the certain value, (ii) if the rate corresponding to the estimated use pattern is lower than the certain value, or (iii) if the amount of variation of the estimated use pattern in the certain period of time is smaller than the certain value; and controlling a terminal to visually output first output information on a display screen of a display of the terminal, wherein the first output information includes (i) information indicating the applicant and the candidate property and (ii) information indicating that the combination of the applicant and the candidate property is determined to be desirable.

15. A computer-readable non-transitory recording medium storing a program, the program causing a computer to perform a process comprising:

storing, in a storage of the computer, information indicating activity pattern of an applicant and information indicating activity patterns of residents of properties neighboring a candidate property, which is a candidate for a property to which the applicant moves, wherein the information indicating the activity pattern of the applicant includes use-pattern-information indicating a use pattern of at least one of power, gas, or water of the applicant, wherein the use pattern of the applicant is generated based on use amount data indicating a temporal change in an amount of the at least one of power, gas, or water used by the applicant, wherein the use amount data of the applicant is acquired from an information providing apparatus connected to the computer via network, wherein the information indicating the activity patterns of the residents of the neighboring properties includes use-pattern-information indicating use patterns of at least one of power, gas, or water of the residents of the neighboring properties, wherein each of the use patterns of the residents of the neighboring properties is generated based on use amount data indicating a temporal change in an amount of the at least one of power, gas, or water used by corresponding one of the residents of the neighboring properties, and wherein use amount data pieces of the residents of the neighboring properties are acquired from the information providing apparatus;

calculating an estimated use pattern by adding the use pattern of the applicant indicated by the stored use-pattern-information of the applicant and the use patterns of the residents of the neighboring properties indicated by the use-pattern-information of the residents of the neighboring properties;

comparing a certain value with (i) a peak of the estimated use pattern in a certain period of time, (ii) a rate corresponding to the estimated use pattern, or (iii) an amount of variation of the calculated estimated use pattern in a certain period of time;

determining that a combination of the applicant and the candidate property is desirable, (i) if the peak of the estimated use pattern in the certain period of time is smaller than the certain value, (ii) if the rate corresponding to the estimated use pattern is lower than the certain value, or (iii) if the amount of variation of the calculated estimated use pattern in the certain period of time is smaller than the certain value; and controlling a terminal to visually output first output information on a display screen of a display of the terminal, wherein the first output information includes (i) information indicating the combination of the applicant and the candidate property which is determined to be desirable in the determining and (ii) information indicating that the combination of the applicant and the candidate property is desirable.

16. A combination desirability determination apparatus comprising:

a storage that stores information indicating activity pattern of an applicant and information indicating activity patterns of residents of properties neighboring a candidate property, which is a candidate for a property to which the applicant moves, wherein the information indicating the activity pattern of the applicant includes use-pattern-information indicating a use pattern of at least one of power, gas, or water of the applicant, wherein the use pattern of the applicant is generated based on use amount data indicating a temporal change in an amount of the at least one of power, gas, or water used by the applicant, wherein the use amount data of the applicant is acquired from an information providing apparatus connected to the combination desirability determination apparatus via network, wherein the information indicating the activity patterns of the residents of the neighboring properties includes use-pattern-information indicating use patterns of at least one of power, gas, or water of the applicant and the residents of the neighboring properties, wherein each of the use patterns of the residents of the neighboring properties is generated based on use amount data indicating a temporal change in an amount of the at least one of power, gas, or water used by corresponding one of the residents of the neighboring properties, and wherein use amount data pieces of the residents of the neighboring properties are acquired from the information providing apparatus; and a processor that calculates a sum of the use amount of the applicant, in the certain period of time, of the use pattern indicated by the stored use-pattern-information of the applicant and the use amounts of the residents of the neighboring properties, in the certain period of time, of use patterns indicated by the stored use-pattern-information of the residents of the neighboring properties, compares a certain value with the sum of the amount used by the applicant in a certain period of time and the amount used by the residents of the neighboring properties in the certain period of time, determines that a combination of the applicant and the candidate property is desirable if the sum of the use amount used by the applicant in the certain period of time and the use amounts by the residents of the neighboring properties in the certain period of time is smaller than the certain value, and controls a terminal to visually output first output information on a display screen of a display of the terminal, wherein the first output information includes (i) information indicating the applicant and the candidate property and (ii) information indicating that the combination of the applicant and the candidate property is determined to be desirable.

17. The combination desirability determination apparatus according to claim 16, wherein, the processor further:

determines that the combination of the applicant and the candidate property is undesirable, if the sum is larger than the certain value; and controls the terminal to visually output second output information on the display screen of the display, the second output information including information indicating that the combination of the applicant and the candidate property is determined to be undesirable.

\* \* \* \* \*